US009335949B1

(12) United States Patent
Palekar et al.

(10) Patent No.: US 9,335,949 B1
(45) Date of Patent: *May 10, 2016

(54) SYSTEM AND METHOD FOR DEFERRING INVALIDATION OF INODES OF A VOLUME DURING VOLUME INVALIDATION

(71) Applicant: NetApp, Inc., Sunnyvale, CA (US)

(72) Inventors: Amber M. Palekar, Sunnyvale, CA (US); Szu-Wen Kuo, Cupertino, CA (US)

(73) Assignee: NetApp, Inc., Sunnyvale, CA (US)

( * ) Notice: Subject to any disclaimer, the term of this patent is extended or adjusted under 35 U.S.C. 154(b) by 528 days.

This patent is subject to a terminal disclaimer.

(21) Appl. No.: 13/776,298

(22) Filed: Feb. 25, 2013

(51) Int. Cl.
*G06F 3/06* (2006.01)

(52) U.S. Cl.
CPC ............ *G06F 3/0652* (2013.01); *G06F 3/0604* (2013.01); *G06F 3/0617* (2013.01); *G06F 3/0683* (2013.01)

(58) Field of Classification Search
CPC ... G06F 3/0604; G06F 3/0617; G06F 3/0652; G06F 3/0683
See application file for complete search history.

(56) References Cited

U.S. PATENT DOCUMENTS

| 6,928,466 | B1 * | 8/2005 | Bulka et al. ................... 709/213 |
| 2007/0061539 | A1 * | 3/2007 | Nonaka et al. ................ 711/170 |
| 2008/0005205 | A1 * | 1/2008 | Rajakarunanayake . G06F 17/30117 |
| 2010/0131474 | A1 * | 5/2010 | Zayas et al. ................... 707/691 |

OTHER PUBLICATIONS

U.S. Appl. No. 13/776,348, titled "System and Method for Invalidation Walk-through of Inodes", filed Feb. 25, 2013. Inventors: Amber M. Palekar and Szu-Wen Kuo.

* cited by examiner

*Primary Examiner* — Aracelis Ruiz
(74) *Attorney, Agent, or Firm* — LeClairRyan, a Professional Corporation

(57) ABSTRACT

A system and method for deferring an invalidation walk-through of a volume in memory and a later invalidation walk-through of inodes the volume are described herein. Node A may store volume information for one or more volumes to memory including inodes of the volume storing data for the volume. Node A performs a primary procedure that may include removing volumes from the memory, such as a procedure that transfers ownership of the volumes to node B. Removing a volume from memory comprises removing its volume information from memory. Node A performs an invalidation deferment procedure that marks each volume as stale for preventing data of the volumes to be served and sends a completion message to node B which begins serving data of the volume. After node B begins serving data of the volume, node A performs an invalidation walk-through procedure to remove inodes of the volume from memory.

18 Claims, 18 Drawing Sheets

SYSTEM AND METHOD FOR DEFERRING INVALIDATION OF INODES OF A VOLUME DURING VOLUME INVALIDATION

FIELD OF THE INVENTION

Embodiments of the present invention relate to storage systems, and in particular, for deferring invalidation of inodes of a volume during volume invalidation.

BACKGROUND

A storage system is a processing system adapted to store and retrieve information/data on storage devices (such as disks). The storage system includes a storage operating system that implements a file system to logically organize the information as a hierarchical structure of directories and files on the storage devices. Each file may comprise a set of data blocks, whereas each directory may be implemented as a specially-formatted file in which information about other files and directories are stored. A storage system may be referred to herein as a "node."

The storage operating system generally refers to the computer-executable code operable on a storage system that manages data access and access requests (read or write requests requiring input/output operations) and may implement file system semantics in implementations involving storage systems. In this sense, the Data ONTAP® storage operating system, available from NetApp, Inc. of Sunnyvale, Calif., which implements a Write Anywhere File Layout (WAFL®) file system, is an example of such a storage operating system implemented as a microkernel within an overall protocol stack and associated storage. The storage operating system can also be implemented as an application program operating over a general-purpose operating system, such as UNIX® or Windows®, or as a general-purpose operating system with configurable functionality, which is configured for storage applications as described herein.

A storage system may be configured to allow server systems to access its contents, for example, to read or write data to the storage system. A server system may execute an application that "connects" to the storage system over a computer network, such as a shared local area network (LAN), wide area network (WAN), or virtual private network (VPN) implemented over a public network such as the Internet. The application executing on the server system may send an access request (read or write request) to the storage system for accessing particular data stored on the storage system.

Currently, a plurality of storage systems may be interconnected as a cluster to provide high availability of data services to the server systems. The nodes of the cluster storage system may be configured to communicate with one another to act collectively to increase performance or to offset any single node failure within the cluster. Each node in the cluster may have a predetermined failover "partner" node. When a node failure occurs (where the failed node is no longer capable of processing access requests), the partner node of the failed node may "takeover" the data services of the failed node. In doing so, access requests sent to the failed node may be re-directed to the partner node for processing. In particular, a cluster may provide data-access service to servers by providing access to shared storage (comprising a set of storage devices). Typically, servers will connect with a node of the cluster for data-access sessions with the node.

The shared storage may comprise a plurality of interrelated storage objects (e.g., aggregates, volumes, files, etc.). For example, the shared storage may comprise a plurality of aggregates, where each aggregate may be configured to contain one or more volumes. The volumes may be configured to store content of other storage objects, such as files and logical units, served by the cluster in response to multi-protocol data access requests. Each node of a cluster may "own" an assigned set of volumes within the shared storage, whereby only the assigned node services data for the assigned volumes during normal operating conditions (when no node has failed). However, upon failure of a node, "ownership" of the volumes of the failed node may be transferred to the partner node (so that serving of data for the volumes of the failed node may be taken over by the partner node). As such, a cluster may be configured such that a partner node may takeover the work load of a failed node where the partner node assumes the tasks of processing and handling any data access requests normally processed by the failed primary node.

A storage system's storage is typically implemented as one or more storage volumes that comprise physical storage devices, defining an overall logical arrangement of storage space. Available storage system implementations can serve a large number of discrete volumes. When a storage system "owns" a volume, it is loaded to the storage system by copying the "volume information" into the storage system's memory. Once a volume has been loaded in memory, the volume may be accessed by one or more servers, applications, devices, and the like, that are permitted to access its contents and navigate its namespace.

For each volume loaded into storage system memory, volume information may comprise a volume head, inode head, and inodes of the volume. The volume head may comprise volume metadata describing the volume. The inode head may comprise a list of inodes (list of inode pointers) of the volume that is used to locate (point to) the inodes of the volume. As known in the art, a file system implemented on the storage system may use a plurality of inodes, each inode representing a file in the file system. An inode may comprise a data structure comprising file metadata, pointers to other indirect blocks or data blocks, and data blocks (containing the actual data of the file).

In some situations, after a volume has been loaded into storage system memory, the volume may need to be removed (invalidated) from memory, typically during an ownership transfer of the volume to another storage system. For example, node A may take ownership of the volumes of failed node B and load the volume information for the volumes into memory. After node B is repaired and comes back online, ownership of the volumes need to be transferred back to node B from node A through a "giveback procedure" so that node B can begin serving data for the volumes. Since node A no longer services data for the volumes, the volume information for the volumes stored in the memory of node A may be removed (invalidated) to free up memory space. Typically, node B can begin serving data for the volumes only after the giveback procedure is completed, but the volume information from the memory of node A must be removed for the giveback procedure to be completed. As such, the procedures for removing the volume information from the memory of node A is time critical as node B cannot begin serving data for the volumes (bring the volumes online) until after completion.

Typically, removing the volume information from memory involves a "walk-through" of the inodes of the volume. During the walk-through procedure, all inodes (and data blocks) of the volume that are currently stored in memory are each located and removed (invalidated). Previously, the memory size of a node was relatively small so that only a small number of the inodes of a volume may be stored in memory at any given time. Due to reduced costs, however, the storage size of storage system memories are increasingly becoming larger so that a larger number of inodes of a volume may be stored in memory at any given time. Thus, the procedures for removing the volume information from memory are increasingly taking longer, which increases the time that the volume is offline and data cannot be accessed from the volume. As such, there is a need for a more efficient system and method for removing volume information from storage system memory.

SUMMARY

A system and method for deferring an invalidation walk-through of a volume in memory and a later invalidation walk-through of inodes the volume are described herein. A storage system (node A) may store volume information for one or more volumes to memory, the volume information comprising a volume head, an inode head, and inodes of the volume. Node A may then perform a "primary procedure" that includes removing one or more volumes from the memory, such as a giveback procedure that transfers ownership of the one or more volumes to another storage system (node B). Removing (invalidating) a volume from memory comprises removing its volume information from memory. Node A performs the primary procedure that includes an invalidation deferment procedure executed by an invalidation deferment engine. After the primary procedure (along with the invalidation deferment procedure) is completed, node A performs an invalidation walk-through procedure, executed by an invalidation walk-through engine, to remove inodes of the volume from memory.

In some embodiments, the invalidation deferment engine is configured for deferring an invalidation walk-through procedure for a volume to be removed from memory until after the primary procedure is deemed complete. During the invalidation deferment procedure, node A may produce a "completion message" indicating that the primary procedure has been completed for the volume, and send the completion message to node B. In some embodiments, node A sends the completion message to node B before the invalidation walk-through procedure for the volume is actually completed by node A and the inodes of the volume have been removed from the memory of node A. In these embodiments, in response to receiving the completion message, node B then owns the transferred volume and begins serving data for the transferred volume by responding to received access requests for data of the at least one storage object (i.e., brings the volume online). As such, deferring the invalidation walk-through procedure for the volume allows the volume to be owned and brought online by another storage system (node B) quickly, before the invalidation walk-through procedure is completed for the volume on node A (and before the inodes of the volume have been removed from the memory of node A), which may be time consuming.

However, deferring the invalidation walk-through procedure of a volume may cause stale/invalid data of the volume to be served to server systems requesting data of the volume from node A. As such, the accessing and serving of stale data of the volume must be prevented by the storage operating system of node A. In some embodiments, the invalidation deferment engine is also configured for marking/indicating the volume as "stale" in memory, thus allowing execution of the invalidation walk-through procedure to be deferred to a later time (e.g., as a background procedure).

The data of the volume may be stored in inodes representing files of the volume. Conventionally, each inode of the volume stored in memory may be located and marked as stale. This method, however, is not time efficient and consumes valuable hardware and software resources of node A. In some embodiments, the invalidation deferment engine is configured for marking/indicating each volume as stale, rather than marking/indicating the individual inodes of each volume. In this manner, each volume can be marked as stale quickly and efficiently. As such, only a single indicator for each volume needs to be configured to show that the volume is stale, which will effectively indicate that each inode (and thus data blocks) of the volume are stale.

In some embodiments, the storage operation system of node A may perform a preparation procedure that is executed prior to the invalidation deferment procedure and the invalidation walk-through procedure. The preparation procedure may prepare and configure volume information for each volume stored in memory for the deferment and walk-through procedures. The preparation procedure may store volume information for one or more volumes to memory, the volume information for a volume comprising a volume head, an inode head, and inodes of the volume.

The volume head may comprise volume metadata describing the volume, including walk-through metadata. The inode head comprises inode pointers to the inodes of the volume, the inode pointers being used for locating the inodes. In some embodiments, each inode head is configured by the storage operation system to also store a volume head pointer for locating the volume head. Each inode may represent a file in the volume. An inode may comprise a data structure comprising file metadata, pointers to indirect blocks or data blocks, and data blocks containing the actual data of the file. In some embodiments, each inode is configured by the storage operation system to also store an inode head pointer (instead of a volume head pointer) for locating the inode head.

For each volume loaded to memory, the preparation procedure also stores a pointer to the inode head of the volume to a list of "active" inode heads in memory. In these embodiments, the storage operating system manages a list of active inode heads and a list of stale inode heads. The list of active inode heads comprises pointers to inode heads of "active" volumes that are still valid and are not to be removed from memory. The list of stale inode heads comprises pointers to inode heads of stale volumes that are no longer valid and are to be removed from memory.

The preparation procedure then begins a primary procedure that involves removing one or more volumes in memory. In some situations, after a volume has been loaded into memory, the volume may need to be removed (invalidated) from memory during a primary procedure. The primary procedure may involve a transfer of ownership of the volume to another storage system. To illustrate, the primary procedure may comprise a giveback procedure. For example, node A may take ownership of the volumes of failed node B and load the volume information for the volumes into memory. After node B is repaired and comes back online, ownership of the volumes need to be transferred back to node B from node A through a "giveback procedure" so that node B can begin serving data for the volumes. Since node A no longer services data for the volumes, the volume information for the volumes stored in the memory of node A may be removed (invalidated) to free up memory space. In other embodiments, the primary procedure comprises a different type of procedure requiring removal of a volume from memory.

Typically, node B can begin serving data for the transferred volumes only after it receives a completion message indicating that the primary procedure (e.g., giveback procedure) is completed. However, typically the volume information from the memory of node A must be removed for the primary procedure to be deemed completed by node A. As such, the procedures for removing the volume information from the memory of node A is time critical as node B cannot own and bring the volumes online and begin serving data for the volumes until after completion. Typically, removing the volume information from the memory of node A involves a time consuming invalidation walk-through procedure to remove the inodes of the volume from memory. In some embodiments, node A deems the primary procedure for a volume to be complete and sends the completion message to node B before the invalidation walk-through procedure is completed to remove the inodes of the volume from the memory of node A. In these embodiments, node B begins to serve data of the transferred volumes before the invalidation walk-through procedure is completed to remove the inodes of the volume from the memory of node A.

An invalidation deferment procedure is then performed by the invalidation deferment engine of node A for each volume to be removed from memory. For each volume, the invalidation deferment procedure copies walk-through metadata of the volume head and stores to the inode head. The walk-through metadata comprises a sub-portion of the volume metadata that is used by the invalidation walk-through engine to perform a later invalidation walk-through procedure for the volume.

For each volume, the invalidation deferment procedure also indicates/marks that the volume as stale. Marking a volume as stale thereby marks all volume information (volume head, inode head, and inodes) stored in memory as stale. In some embodiments, the invalidation deferment procedure may indicate that a volume is stale by removing the volume head pointer from the inode head of the volume. In these embodiments, an inode head that does not comprise a volume head pointer indicates that all volume information (including inodes) of the volume stored in memory are stale, and thus are not to be accessed and served. As such, by simply removing the volume head pointer from the inode head, all inodes of a volume may be quickly and efficiently marked as stale. Thus, a time and resource consuming walk-through of the inodes does not need to be performed, whereby each inode of the volume is individually located and marked. Note that in a walk-through of the inodes, each data block/buffer of each inode would also need to be individually located and marked, which is especially time and resource consuming.

Upon receiving an access request for data of a volume, the storage operating system is configured to determine whether the inode head of the volume comprises a volume head pointer to determine whether data for the volume stored is stale or not, and thus whether to serve the requested data or not. For example, the storage operating system may receive an access request requesting particular data. The storage operating system may map the request to an inode in memory that contains the requested data. The storage operating system may use the inode head pointer in the inode to locate the inode head for the requested volume. If the storage operating system determines that the inode head comprises a volume head pointer, it returns the requested data. If the storage operating system determines that the inode head does not comprise a volume head pointer, it does not return the requested data (e.g., sends an "invalid request" message).

For each volume, the invalidation deferment procedure then removes the volume head from memory. Since the walk-through metadata of the volume head has already been stored to the inode head and the volume head pointer has already been removed from the inode head, the volume head is no longer required and may be removed from memory. For each volume, the invalidation deferment procedure then determines that the primary procedure is complete and transmits/sends a completion message to node B indicating that the primary procedure has been completed for the volume. In response to receiving the completion message for a volume, node B begins serving data of the volume. Note that most storage operating systems and file systems are configured to allow the primary procedure to be deemed/determined complete for a volume only after the volume head of the volume is removed from memory. As such, after the volume head for a volume is removed from memory, the invalidation deferment procedure may deem the primary procedure for the volume complete and transmit the completion message for the volume to node B.

In some embodiments, for each volume to be removed, various steps of the invalidation deferment procedure are executed before the invalidation walk-through procedure is completed for removing inodes of the volume from memory. For example, for each volume, the walk-through metadata of the volume head is stored to the inode head, which in turn allows the volume head to be removed from memory (before the invalidation walk-through procedure is completed), which in turn allows the primary procedure to be deemed complete (before the invalidation walk-through procedure is completed), which in turn allows the completion message to be sent to node B (before the invalidation walk-through procedure is completed), which in turn allows node B to begin serving data for the volume (before the invalidation walk-through procedure is completed). As such, the embodiments herein allow the node B to bring transferred volumes online and begin serving data for the volumes quickly, with less time delay.

After the primary and invalidation deferment procedures are completed, an invalidation walk-through procedure is performed by the invalidation walk-through engine on each volume to be removed from memory. Although the invalidation walk-through has been delayed by the invalidation deferment procedure, the inodes of each volume still needs to be located and removed from memory. This procedure may still require a significant amount of time depending on the number of inodes stored in memory. However, this is mitigated by several factors. First, node B is not waiting on the invalidation walk-through procedure to be completed to own and bring the volumes online, since the volumes have already been brought online by node B during the invalidation deferment procedure. Second, the data of each volume has already been marked as stale, so there is no risk of stale data being served while the invalidation walk-through procedure is performed. Third, in some embodiments, since the invalidation walk-through procedure is a background procedure, multiple processing threads may be used to perform the invalidation walk-through procedure in parallel (simultaneously).

In some embodiments, for each volume to be removed from memory, the invalidation walk-through procedure is performed to remove inodes of the volume from memory after the primary procedure for the volume is deemed/determined to be complete. Also, the invalidation walk-through procedure for a volume is performed after the completion message for the volume is sent to node B. Further, the invalidation walk-through procedure for a volume is performed after node B begins serving data for the volume.

In some embodiments, each volume to be removed from memory is represented and listed on a list of stale inode heads. For example, for each volume to be removed from memory, a pointer to the inode head may be stored on the list of stale inode heads. The storage operating system may manage the list of stale inode heads to determine which volumes to remove from memory during the invalidation walk-through procedure. In some embodiments, multiple processing threads may be used to perform the invalidation walk-through procedure on multiple volumes in parallel (simultaneously).

In some embodiments, for each volume to be removed from memory, the invalidation walk-through procedure is performed using walk-through metadata stored to the inode head of the volume. The walk-through metadata may comprise volume metadata that was transferred from the volume head of the volume prior to its removal from memory.

In some embodiments, for each volume to be removed from memory, the invalidation walk-through procedure is performed using the inode head of the volume. In these embodiments, for each volume to be removed from memory, the invalidation walk-through procedure is performed without using the volume head of the volume, whereby the volume head has already been removed from memory.

For each volume to be removed from memory, the invalidation walk-through procedure transfers the volume from the list of "active" inode heads to the list of "stale" inode heads by removing the pointer to the inode head of the volume from the active list and storing the pointer to the stale list. The invalidation walk-through procedure sets a current stale volume and inode head represented by a current stale inode head pointer (specified on the list of stale inode heads) and assigns a processing thread to process the current stale volume and inode head. The first thread may be executed by a first processor. In some embodiments, the current stale inode head is oldest stale inode head specified in the list of stale inode heads, whereby the stale inode heads specified in the list of stale inode heads are processed by first-in first-out (FIFO) order. In other embodiments, the stale inode heads specified in the list of stale inode heads are processed in a different order. In some embodiments, multiple threads may be assigned to simultaneously process multiple stale inode heads specified in the list of stale inode heads, whereby each thread may be executed by a different processor. The invalidation walk-through procedure then locates the current stale inode head using the current stale inode head pointer 1510.

The invalidation walk-through procedure retrieves the walk-through metadata from the current stale inode head. The invalidation walk-through procedure may use the walk-through metadata to perform the invalidation walk-through of the inodes of the current stale volume and inode head. Using the current stale inode head, the invalidation walk-through procedure then performs the invalidation walk-through of the inodes of the current stale volume to locate and remove, from memory, each inode of the current stale volume. The stale inode head comprises inode pointers to all the stale inodes that are to be removed from memory. Each inode may comprise a data structure comprising pointers to indirect blocks or data blocks, and data blocks. As such, the various pointers may be used to locate and invalidate each inode (including all data blocks of each inode) of the current stale volume stored in memory. In some embodiments, each inode also comprises an inode head pointer. In these embodiments, the invalidation walk-through procedure also removes the inode head pointer of each inode from memory.

The invalidation walk-through procedure then removes the current stale inode head from memory. In some embodiments, each inode head comprises walk-through metadata which is also removed from memory. The invalidation walk-through procedure then removes the current stale inode head pointer from the list of stale inode heads. The invalidation walk-through procedure may be performed for each volume to be removed from memory.

DETAILED DESCRIPTION

Figure 1:
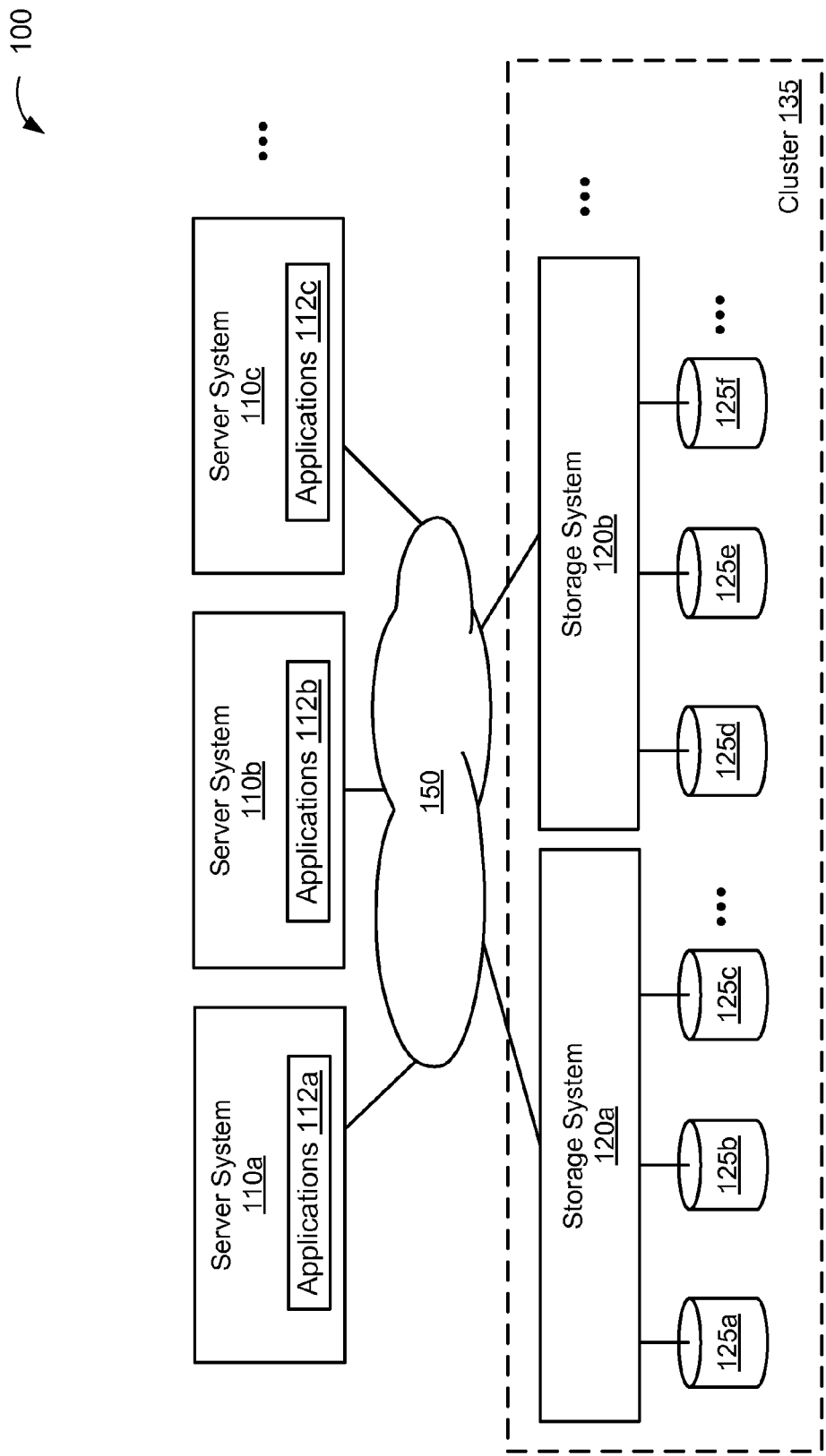
FIG. 1 is a schematic diagram of an exemplary storage system environment in which some embodiments operate.

In the following description, numerous details and alternatives are set forth for purpose of explanation. However, one of ordinary skill in the art will realize that embodiments can be practiced without the use of these specific details. In other instances, well-known structures and devices are shown in block diagram form to not obscure the embodiments with unnecessary detail.

The description that follows is divided into four sections. Section I contains terms used herein. Section II describes a storage system environment in which some embodiments operate. Section III describes a system and method for deferring invalidation of inodes of a volume during volume invalidation in memory. Section IV describes a system and method for an invalidation walk-through of inodes of a volume.

I. Terms

Cluster storage system: As used herein, a cluster storage system may comprise a set of one or more storage systems. A storage system is sometimes referred to as a "node," and the terms "node" and "storage system" may be used interchangeably.

Storage object: As used herein, a storage object comprises any type of container for storing data. Examples of storage objects include, but are not limited to, files, LUs, qtrees, volumes, flexible volumes, aggregates, storage devices, etc. For illustrative purposes, the embodiments below are described in relation to a volume. However, in other embodiments, any other type of storage object may be used in the embodiments below. A storage object is considered to be "online" when a node is serving data of the storage object by processing and responding to access requests (such as read or write requests) for data of the storage object, the access requests being received from clients such as server systems. A storage object is considered to be "offline" when there is no node serving data of the storage object.

Storage object information/data: As used herein, storage object information/data for a storage object comprises a storage object head data structure, inode head data structure, and inode data structures of the storage object. For example, volume information/data for a volume may comprise a volume head data structure, inode head data structure, and inode data structures of the volume. The terms storage object and storage object information may sometimes be used interchangeably. For example, a "volume" may sometimes refer to the "volume information" for the volume. For example, a volume to be removed from memory may refer to the volume information for the volume to be removed from memory.

Storage object head data structure: As used herein, a storage object head data structure for a storage object comprises a data structure that represents the storage object and stores metadata describing the storage object. For example, a volume head data structure ("volume head") for a volume comprises a data structure that represents the volume and stores metadata describing the volume. For example, the volume head may store volume metadata such as a volume identifier, file system identifier, type of volume (e.g., flexible, traditional, etc.), storage size of the volume, volume level identifier, current state of the volume, type of buffer trees, and other metadata describing a volume. In some embodiments, a subportion of the volume metadata (referred to as "walkthrough" metadata) may be needed to perform an invalidation walk-through of inodes of a volume stored in memory.

Inode head data structure: As used herein, an inode head data structure ("inode head") for a volume comprises a data structure storing a list of inodes of the volume. In some embodiments, the inode head comprises pointers to the inodes of the volume that are used for locating the inodes of the volume.

Inode: As used herein, an inode data structure ("inode") of a volume comprises a data structure representing a file of the volume. A file system implemented on a storage system may use a plurality of inodes for representing a plurality of files in a volume. An inode may comprise a data structure comprising file metadata, pointers to indirect blocks or data blocks, and data blocks (containing the actual data of the file). For example, an inode may comprise a data structure comprising a root level inode (containing file metadata and pointers to data blocks or indirect blocks), zero or more indirect blocks (containing pointers to data blocks or other indirect blocks), and one or more data blocks (containing the actual data of the file). A data block is sometimes referred to as a data buffer. In other embodiments, the data blocks/buffers may be considered distinct and separate from the inode, whereby an inode comprises file metadata and pointers to the data blocks.

Stale storage object data: As used herein, stale storage object data for a storage object comprises data that is no longer current and valid, and is not to be accessed and served (returned in response to an access request). For example, a stale volume may comprise stale inodes comprising stale data blocks/buffers that are no longer current and valid and should not be served. In some embodiments, a volume is marked/indicated as stale to prevent access to data of the volume. In these embodiments, marking a volume as stale thereby marks all volume information stored in memory as stale. In contrast, an active storage object comprises data that is current and valid.

Invalidating data in memory: As used herein, invalidating data in memory frees up the storage space used by the data in memory. For example, invalidating data may comprise entering null values for the data in memory. Invalidating data may sometimes be referred to as removing or deleting the data in memory.

Primary procedure: In the embodiments described herein, for illustrative purposes only, a volume is removed (invalidated) from storage system memory upon transfer of ownership of the volume to another storage system during a giveback procedure. In other embodiments, however, a volume is removed from storage system memory during any other type of procedure needing volume removal from a storage system memory. For example, the volume may be removed from memory during a workload balance procedure, etc. The giveback procedure and other types of procedures needing volume removal from storage system memory are referred to herein as the "primary procedure." Note that a primary procedure may or may not include the ownership transfer of the volume to another storage system.

Completion message: When node A executes a primary procedure, it may transmit a completion message to node B indicating that node A has completed performing the primary procedure. For example, node A may execute a giveback procedure for transferring ownership of a volume to node B, and transmit a completion message to node B when the giveback procedure is completed. In response to receiving a completion message for a transferred volume, node B may then bring the transferred volume online and begin service data of the transferred volume.

II. Storage System Environment

FIG. 1 is a schematic diagram of an exemplary storage system environment 100 in which some embodiments operate. The environment 100 may comprises a set of one or more server systems 110 and one or more storage systems 120. The server systems 110 may each access one or more storage systems 120 that are connected to the server systems 110 via a network 150. The one or more storage systems 120 comprise a cluster storage system 135. Each storage system 120 in the cluster 135 may comprise a set of storage devices 125 for storing client data, the storage devices 125 of the cluster 135 comprising a shared storage of the storage systems 120.

The storage systems 120 (nodes) may be interconnected as a cluster 135 to provide high availability of data services to the server systems 110. The nodes 120 of the cluster may be configured to communicate with one another to act collectively to increase performance or to offset any single node failure within the cluster. Each node in the cluster may have a predetermined failover "partner" node. When a node failure occurs (where the failed node is no longer capable of processing access requests), the partner node of the failed node may "takeover" the data services of the failed node. In doing so, access requests sent to the failed node may be re-directed to the partner node for processing. In particular, a cluster may provide data-access service to servers by providing access to the shared storage. Typically, servers will connect with a node of the cluster for data-access sessions with the node.

The shared storage may comprise a plurality of interrelated storage objects (e.g., aggregates, volumes, files, etc.). For example, the shared storage may comprise a plurality of aggregates, where each aggregate may be configured to contain one or more volumes. The volumes may be configured to store content of other storage objects, such as files and logical units, served by the cluster in response to multi-protocol data access requests. Each node of a cluster may "own" an assigned set of volumes within the shared storage, whereby only the assigned node services data for the assigned volumes during normal operating conditions (when no node has failed). However, upon failure of a node, "ownership" of the volumes of the failed node may be transferred to the partner node (so that serving of data for the volumes of the failed node may be taken over by the partner node). As such, a cluster may be configured such that a partner node may take over the work load of a failed node where the partner node assumes the tasks of processing and handling any data access requests normally processed by the failed primary node.

A server system 110 may comprise a computer system that may execute one or more applications 112 that interacts with the storage systems 120 for receiving read/write access requests and receiving or transmitting data over the network 150. An application 112 executing on a server system 110 may transmit access requests for data from the storage system (s) 120 to utilize the services of the storage system 120 to access, store, and manage data in a set of storage devices 125. As such, a server system 110 may execute one or more applications 112 that submit access requests for accessing particular storage objects on the storage devices. Each application 112 may submit access requests for accessing particular storage objects on the storage systems of the cluster 135 and the cluster 135 may perform the received requests on the storage objects.

A storage system 120 may be coupled to a server system 110 over a network 150 such as a local area network (LAN), an Ethernet subnet, a PCI or PCIe subnet, a switched PCIe subnet, a wide area network (WAN), a metropolitan area network (MAN), the Internet, or the like. In some embodiments, a server system 110 may comprise a chassis hosting multiple instances of server systems 110 within a single chassis (e.g., a blade server chassis), with each instance of a server system 110 in communication with each other instance of a server system 110 in the chassis via network 150. The storage systems 120 may be coupled through a switching fabric (not shown) to other storage systems 120 in the cluster 135. In this way, all the storage systems 120 of the cluster 135 may be interconnect to form a single storage pool that may be accessed by the connected server systems 110.

The storage systems 120 comprise functional components that cooperate to provide a distributed storage system architecture providing consolidated data services to the server systems 110. A server system 110 may comprise a computer system that utilizes services of the cluster storage system 135 to store and manage data in the storage devices 125 of the storage systems 120. Interaction between a server system 110 and a storage system 120 can enable the provision of storage services. That is, server system 110 may request the services of the storage system 120, and the storage system 120 may return the results of the services requested by the server system 110, by exchanging packets over the connection system 150. The server system 110 may request the services of the storage system by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the server system 110 may issue packets including block-based access protocols, such as the Fibre Channel Protocol (FCP), or Internet Small Computer System Interface (iSCSI) Storage Area Network (SAN) access, when accessing information in the form of blocks.

The storage system 120 may comprise a computer system that stores data in a set of storage devices 125. The storage system 120 may implement a file system to logically organize the data as storage objects on the storage devices 125. A storage device 125 may comprise writable storage device media such as storage devices, video tape, optical devices, DVD, magnetic tape, flash memory, Magnetic Random Access Memory (MRAM), Phase Change RAM (PRAM), or any other similar media adapted to store information (including data and parity information).

As known in the art, a storage device 125 may comprise storage objects comprising one or more storage volumes, where each volume has a file system implemented on the volume. A file system implemented on the storage devices 125 may provide multiple directories in a single volume, each directory containing zero or more filenames. A file system provides a logical representation of how data (files) are organized on a volume where data (files) are represented as filenames that are organized into one or more directories. Examples of common file systems include New Technology File System (NTFS), File Allocation Table (FAT), Hierarchical File System (HFS), Universal Storage Device Format (UDF), UNIX® file system, and the like. For the Data ONTAP® storage operating system (available from NetApp, Inc. of Sunnyvale, Calif.) which may implement a Write Anywhere File Layout (WAFL®) file system, there is typically a WAFL file system within each volume, and within a WAFL file system, there may be one or more logical units (LUs).

Figure 2:
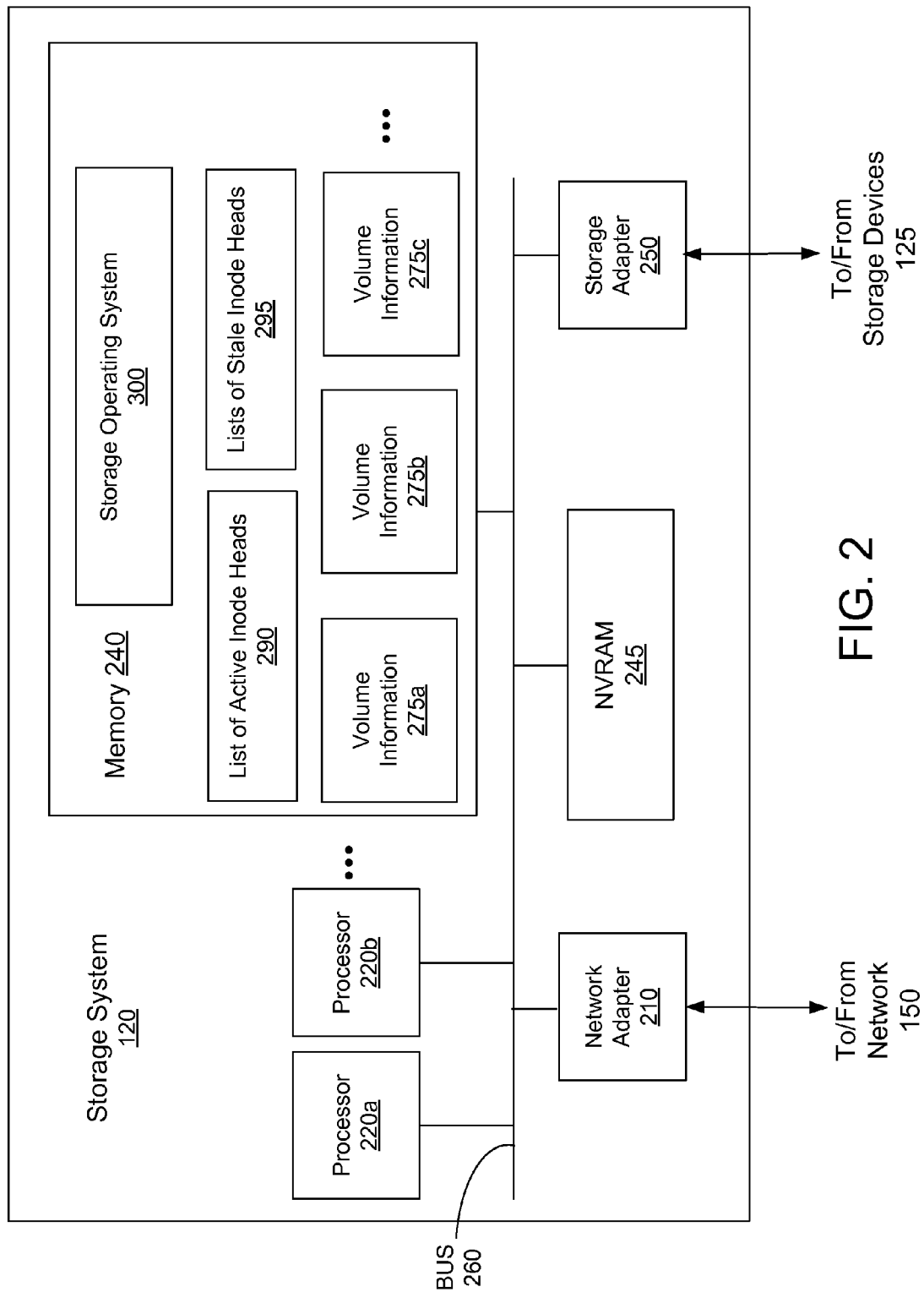
FIG. 2 is a schematic diagram of an exemplary storage system that may be employed in the storage system environment in which some embodiments operate.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a standalone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The storage system 120 comprises a network adapter 210, one or more processors 220 (such as 220a, 220b, etc.), a memory device 240, a non-volatile random access memory (NVRAM) 245, and a storage adapter 250 interconnected by a system bus 260. The network adapter 210 comprises the mechanical, electrical and signaling circuitry needed to connect the storage system 120 to a server system 110 over a computer network 150. The storage system may include one or more network adapters. Each network adapter 210 has a unique IP address and may provide one or more data access ports for server systems 110 to access the storage system 120 (where the network adapter accepts read/write access requests from the server systems 110 in the form of data packets).

The memory device 240 comprises storage locations that are addressable by the processor(s) 220 and adapters for storing software program code and data. The memory device 240 may comprise a form of random access memory (RAM)

that is generally cleared by a power cycle or other reboot operation (e.g., it is a "volatile" memory). In other embodiments, however, the memory 240 may comprise a non-volatile form of memory that does not require power to maintain information. The processor(s) 220 and adapters may, in turn, comprise processing elements and/or logic circuitry configured to execute the software code and manipulate the data stored in the memory 240.

The storage system 120 may also include a NVRAM 245 that may be employed as a backup memory that ensures that the storage system 120 does not "lose" received information, e.g., CIFS and NFS requests, in the event of a system shutdown or other unforeseen problem. The NVRAM 245 is typically a large-volume solid-state memory array (RAM) having either a back-up battery, or other built-in last-state-retention capabilities (e.g. a FLASH memory), that holds the last state of the memory in the event of any power loss to the array. Therefore, even if an access request stored in memory 240 is lost or erased (e.g., due to a temporary power outage) it still may be recovered from the NVRAM 245.

The processor(s) 220 executes a storage operating system application 300 of the storage system 120 that functionally organizes the storage system by, inter alia, invoking storage operations in support of a file service implemented by the storage system. In some embodiments, the storage operating system 300 comprises a plurality of software layers that are executed by the processor(s) 220. Portions of the storage operating system 300 are typically resident in memory 240. It will be apparent to those skilled in the art, however, that other processing and memory means, including various computer readable media, may be used for storing and executing program instructions pertaining to the storage operating system 300.

In some embodiments, the storage operating system may load and store volume information 275 for one or more volumes to the memory 240. The example of FIG. 2 shows a memory 240 volume information 275 for different volumes, such as volume information 275a, 275b, etc. For each volume, the volume information 275 may comprise a volume head, inode head, and inodes of the volume that are loaded and stored to memory 240. The volume information 275 for a volume may be loaded to memory 240, for example, when the storage system "owns" the volume (provides data access server for the volume) and an access request has been received, from a server system 110, for particular data of the volume. Once volume information 275 for a volume has been loaded in memory, the data of the volume may be readily accessed by servers, applications, devices, and the like. In some embodiments, the storage operating system also manages a list of active inode heads 290 and a list of stale inode heads 295 and stores the lists to memory 240.

The storage adapter 250 cooperates with the storage operating system 300 executing on the storage system 120 to access data requested by the server system 110. The data may be stored on the storage devices 125 that are attached, via the storage adapter 250, to the storage system 120 or other node of a storage system as defined herein. The storage adapter 250 includes input/output (I/O) interface circuitry that couples to the storage devices 125 over an I/O interconnect arrangement, such as a conventional high-performance, Fibre Channel serial link topology. In response to an access request received from a server system 110, data may be retrieved by the storage adapter 250 and, if necessary, processed by the processor 220 (or the adapter 250 itself) prior to being forwarded over the system bus 260 to the network adapter 210, where the data may be formatted into a packet and returned to the server system 110.

In an illustrative embodiment, the storage devices 125 may comprise disk devices that are arranged into a plurality of volumes, each having a file system associated therewith. In some embodiments, the storage devices 125 comprise disk devices that are configured into a plurality of RAID (redundant array of independent disks) groups whereby multiple storage devices 125 are combined into a single logical unit (i.e., RAID group). In a typical RAID group, storage devices 125 of the group share or replicate data among the disks which may increase data reliability or performance. The storage devices 125 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of storage devices 125 and may be embodied as a plurality of RAID groups.

The organization of a storage operating system 300 for the exemplary storage system 120 is now described briefly. However, it is expressly contemplated that the principles of the embodiments described herein can be implemented using a variety of alternative storage operating system architectures. As discussed above, the term "storage operating system" as used herein with respect to a storage system generally refers to the computer-executable code operable on a storage system that implements file system semantics (such as the above-referenced WAFL®) and manages data access. In this sense, Data ONTAP® software is an example of such a storage operating system implemented as a microkernel. The storage operating system can also be implemented as an application program operating over a general-purpose operating system, such as UNIX® or Windows®, or as a general-purpose operating system with configurable functionality.

Figure 3:
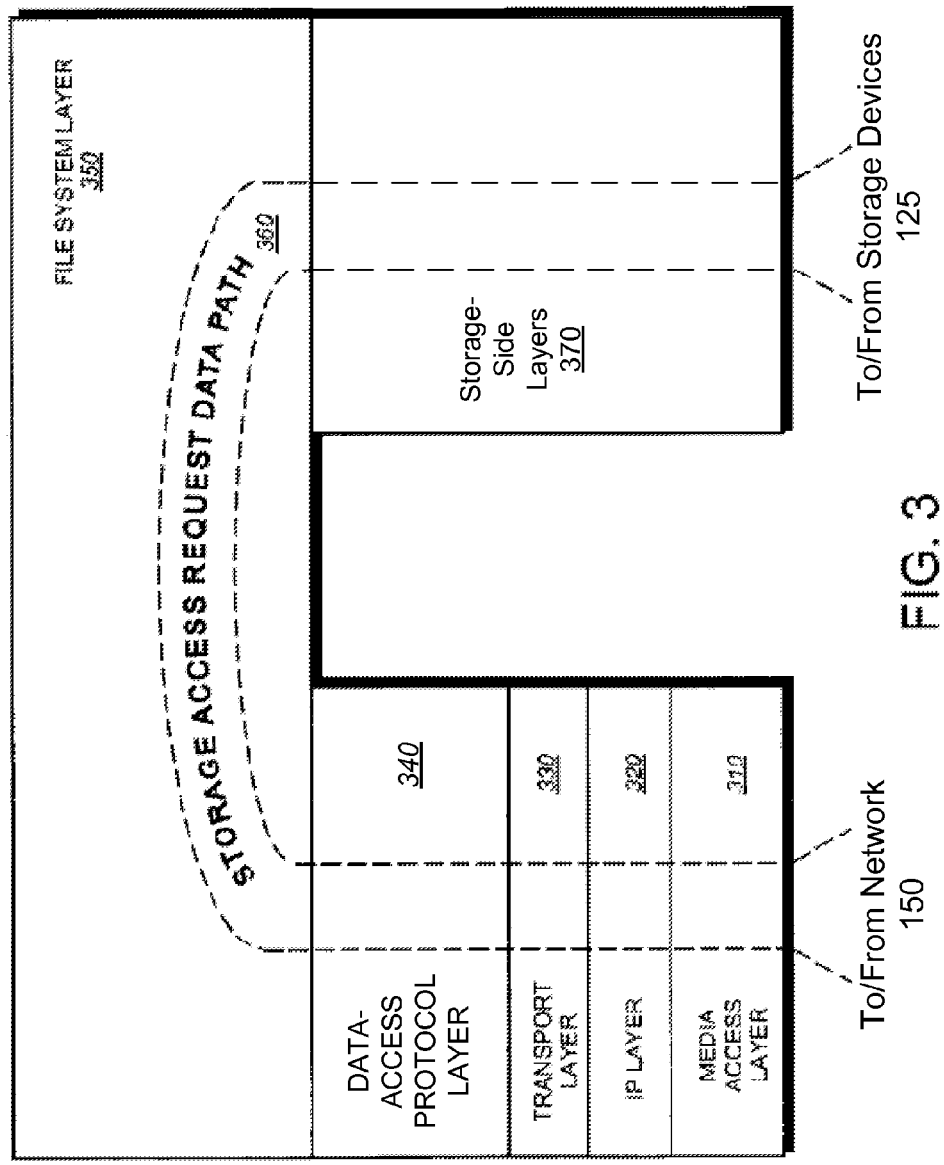
FIG. 3 is a schematic diagram of a set of software layers that form an integrated protocol software stack used in a storage operating system in accordance with some embodiments.

As shown in FIG. 3, the storage operating system 300 comprises a set of software layers that form an integrated protocol software stack. The protocol stack provides data paths 360 for server systems 110 to access data stored on the storage system 120 using data-access protocols. The protocol stack includes a media access layer 310 of network drivers (e.g., an Ethernet driver). The media access layer 310 interfaces with network communication and protocol layers, such as the Internet Protocol (IP) layer 320 and the transport layer 330 (e.g., TCP/UDP protocol). The IP layer 320 may be used to provide one or more data access ports for server systems 110 to access the storage system 120. In some embodiments, the IP layer 320 layer provides a dedicated private port for each of one or more remote-file access protocols implemented by the storage system 120.

A data-access protocol layer 340 provides multi-protocol data access and, for example, may include file-based access protocols, such as the Hypertext Transfer Protocol (HTTP) protocol, the NFS protocol, the CIFS protocol, and so forth. The storage operating system 300 may include support for other protocols, such as block-based access protocols. Such protocols may include, but are not limited to, the direct access file system (DAFS) protocol, the web-based distributed authoring and versioning (WebDAV) protocol, the Fibre Channel Protocol (FCP), the Internet small computer system interface (iSCSI) protocol, and so forth.

The storage operating system 300 may manage the storage devices 125 using storage-side layers 370. The storage-side layers 370 may include a storage layer that implements a storage protocol (such as a RAID protocol) and a device driver layer that implements a device control protocol (such as small computer system interface (SCSI), integrated drive electronics (IDE), etc.). Bridging the storage-side layers 370 with the network and protocol layers is a file system layer 350 of the storage operating system 300. In an illustrative embodiment, the file system layer 350 implements a file system having an on-disk format representation that is block-based using inodes to describe the files.

The file system layer 350 assigns, for each file, an associated inode. An inode may comprise a data structure used to store file metadata information about the file (such as name of the file, when the file was produced or last modified, ownership of the file, access permission for the file, size of the file, etc.). For each volume, the file system 350 may store and maintain an inode head that comprises a list of inode pointers that point to the inodes of the various files of the volume.

In response to receiving a file-access request from a server system 110, the file system 350 generates operations to load (retrieve) the requested data from the storage system's memory 240 or the storage devices 125. The access request typically identifies a file or directory requested by the server system 110. Specifically, the access request may specify a volume identifier and a file identifier for the requested data. The volume identifier may sometimes be referred to as a volume file system identifier ("fsid").

The file system 350 may map the volume identifier and file identifier to an address location of a corresponding inode in memory, the corresponding inode containing the requested data. For example, as known in the art, the file system 350 may map the volume identifier and file identifier ("fileid") to the address location of the corresponding inode using a hash function and hash table. The file system 350 may then locate, in memory 240, the corresponding inode containing the requested data using the address location, and then retrieve file location information (e.g., logical block number) from the inode to retrieve the requested data. The file system layer 350 then passes the logical block number to the appropriate driver (for example, an encapsulation of SCSI implemented on a fibre channel interconnection) of the device driver layer 385. The device driver layer 385 accesses the appropriate blocks from the storage devices 125 and loads the requested data in memory 240 for processing by the storage system 120. Upon successful completion of the request, the storage system (and storage operating system) returns a response (e.g., a conventional acknowledgement packet defined by the CIFS specification) to the server system 110 over the network 150.

It should be noted that the software "path" 360 through the storage operating system layers described above needed to perform data storage access for the requests received at the storage system may alternatively be implemented in hardware or a combination of hardware and software. That is, in an alternative embodiment, the storage access request path 360 may be implemented as logic circuitry embodied within a field programmable gate array (FPGA) or an application specific integrated circuit (ASIC). This type of hardware implementation may increase the performance of the file service provided by storage system 120 in response to a file system request packet issued by server system 110. Moreover, in a further embodiment, the processing elements of network and storage adapters 210 and 250 may be configured to offload some or all of the packet processing and storage access operations, respectively, from processor 220 to thereby increase the performance of the data access service provided by the storage system 120.

Figure 4:
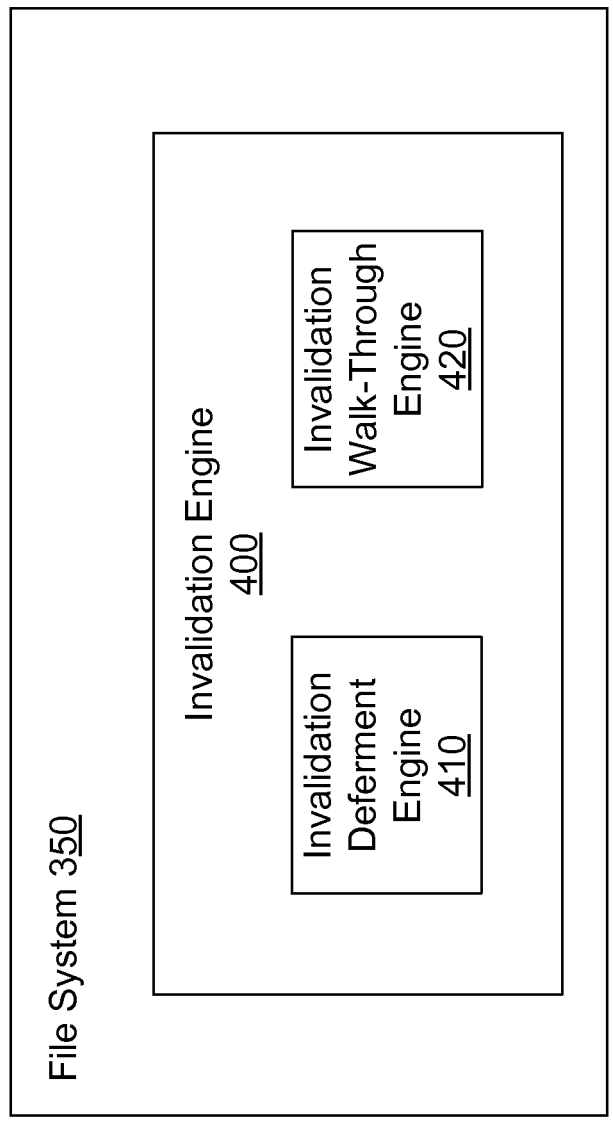
FIG. 4 is a schematic diagram of a file system layer for an exemplary storage system in which some embodiments operate.

As shown in FIG. 4, the file system 350 may include an invalidation engine 400. In some embodiments, the invalidation engine 400 is configured for invalidating information/data of a storage object stored in memory 240. For example, the invalidation engine 400 may be configured for invalidating volume information for a volume stored in memory 240. Invalidating data of a storage object stored in memory 240 may be performed when the storage object is no longer needed, such as when the storage object is being transferred to another storage system (e.g., during a giveback procedure). The invalidation engine 400 may comprise an invalidation deferment engine 410 (discussed below in Section III) and an invalidation walk-through engine 420 (discussed below in Section IV).

Figure 5:
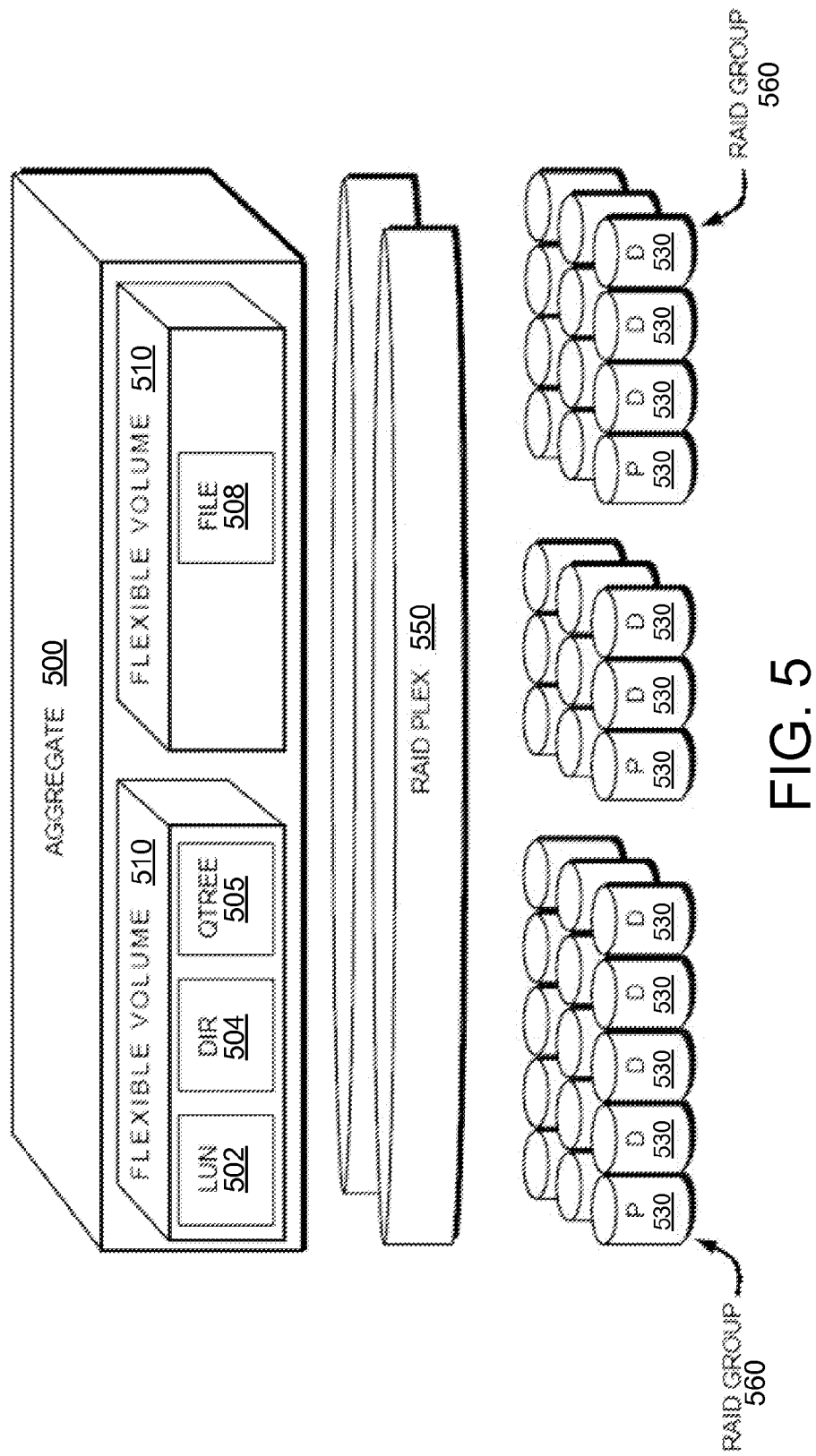
FIG. 5 is a schematic block diagram of an embodiment of an aggregate that may be used in some embodiments.

FIG. 5 is a schematic block diagram of an embodiment of an aggregate 500 that may be used in some embodiments. The total storage space of an aggregate 500 may be allocated among a set of one or more volumes, such as flexible volumes 510. A flexible volume 510 may be dynamically increased or decreased in storage size within the total storage space of the aggregate 500. Each flexible volume 510 may comprise one or more storage objects, such as, Luns (blocks) 502, directors 504, qtrees 506, files 508, etc. The aggregate 500 is illustratively layered on top of a RAID system, which is represented by at least one RAID plex 550 (depending upon whether the storage configuration is mirrored), wherein each RAID plex 550 comprises at least one RAID group 550. Each RAID group 550 further comprises a plurality of storage disks 530, e.g., one or more data disks and at least one parity disk.

Figure 6:
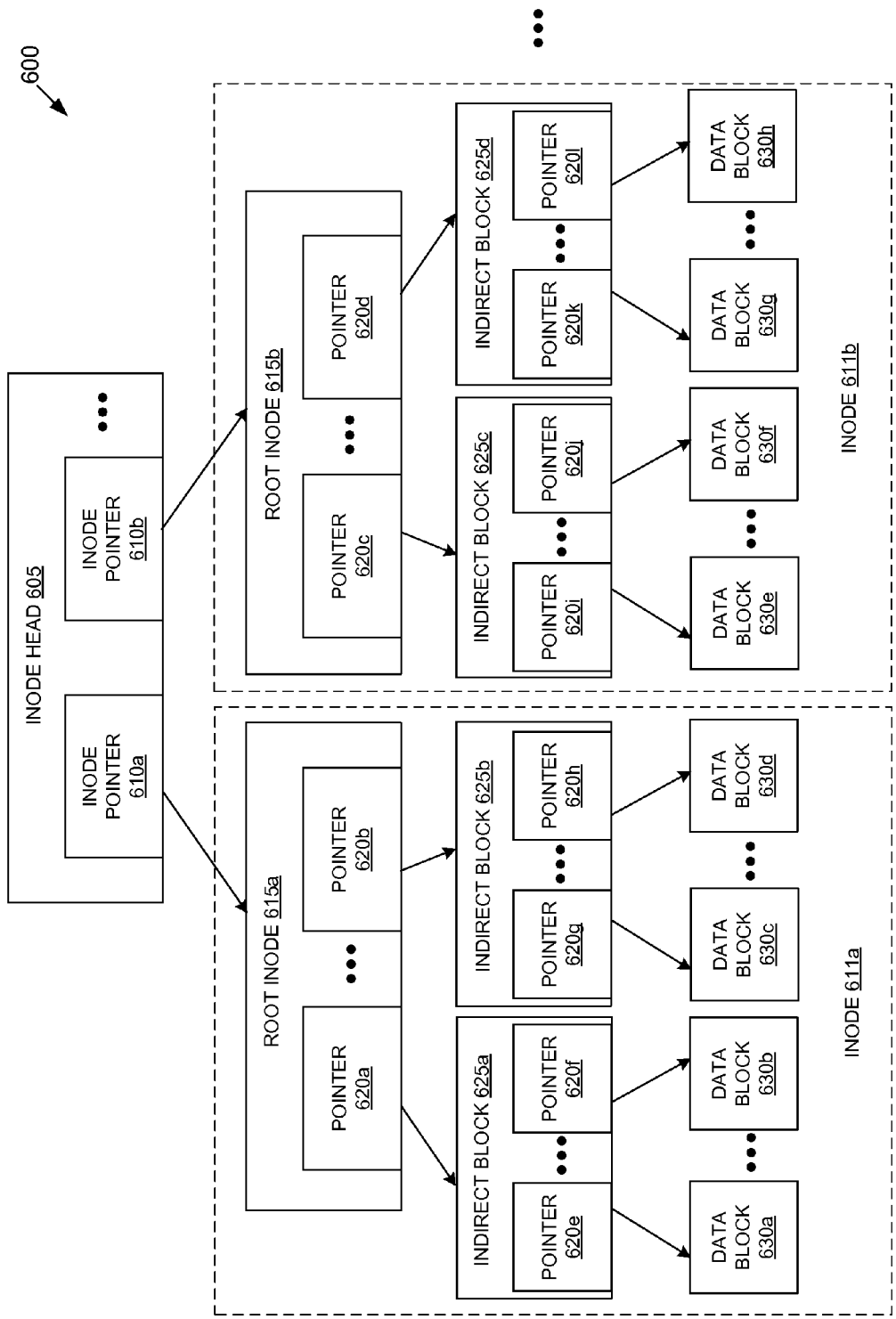
FIG. 6 is a conceptual diagram of various inodes of a volume in accordance with some embodiments.

FIG. 6 is a conceptual diagram 600 of various inodes of a volume in accordance with some embodiments. The file system layer 350 may assign, for each file in the volume, an associated inode. For one or more volumes, the file system 350 may load and store volume information for each volume into memory 240. Volume information may include a volume head (not shown), inode head 605, and inodes 611 (such as 611*a*, 611*b*, etc.) of the volume. The inode head 605 may comprise a list of inodes 611 of the volume that is used to locate the inodes of the volume. In some embodiments, the inode head 605 comprises inode pointers 610 (such as 610*a*, 610*b*, etc.) to the inodes 611 of the volume, the inode pointers 610 being used for locating the inodes 611.

Each inode 611 may represent a file in the volume. An inode 611 may comprise a data structure comprising file metadata (not shown), pointers 620 (such as 620*a*, 620*b*, etc.) to indirect blocks 625 (such as 625*a*, 625*b*, etc.) or data blocks 630 (such as 630*a*, 630*b*, etc.), and data blocks 630 (containing the actual data of the file). For example, an inode 611 may comprise a data structure comprising a root level inode 615 (such as 615*a*, 615*b*, etc.), zero or more indirect blocks 625 (containing pointers to data blocks 630 or other indirect blocks 625), and one or more data blocks 630. Note that the inode pointer 610 in the inode head 605 typically points to the root level inode 615. The root level inode 615 may comprise file metadata and pointers 620 to data blocks or indirect blocks. File metadata may include information such as name of the file, when the file was produced or last modified, ownership of the file, access permission for the file, size of the file, etc.). In other embodiments, the data blocks 630 may be considered distinct and separate from the inode 611, whereby an inode 611 comprises file metadata and pointers to the data blocks.

As such, an inode 611 contains pointers 620 that ultimately lead to the storage locations of the data blocks 630 of the file. The pointers to the data blocks may comprise address locations indicating where the data blocks are stored on a storage device or in memory. For relatively small files, the pointers in the inode may lead directly to the data blocks. For larger files, however, one or more levels of indirection may be needed and the pointers may lead to indirect blocks that also store pointers ultimately leading to the data blocks of the file. An indirect block stores pointers to data blocks or other indirect blocks. The inode data structure 611 may implement zero or more levels of indirect blocks. In the example of FIG. 6, the inode data structures 611 comprise one level of indirect blocks. In other embodiments, however, the inode data structures may comprise a different number of indirection levels depending upon the size of the file.

Figure 7:
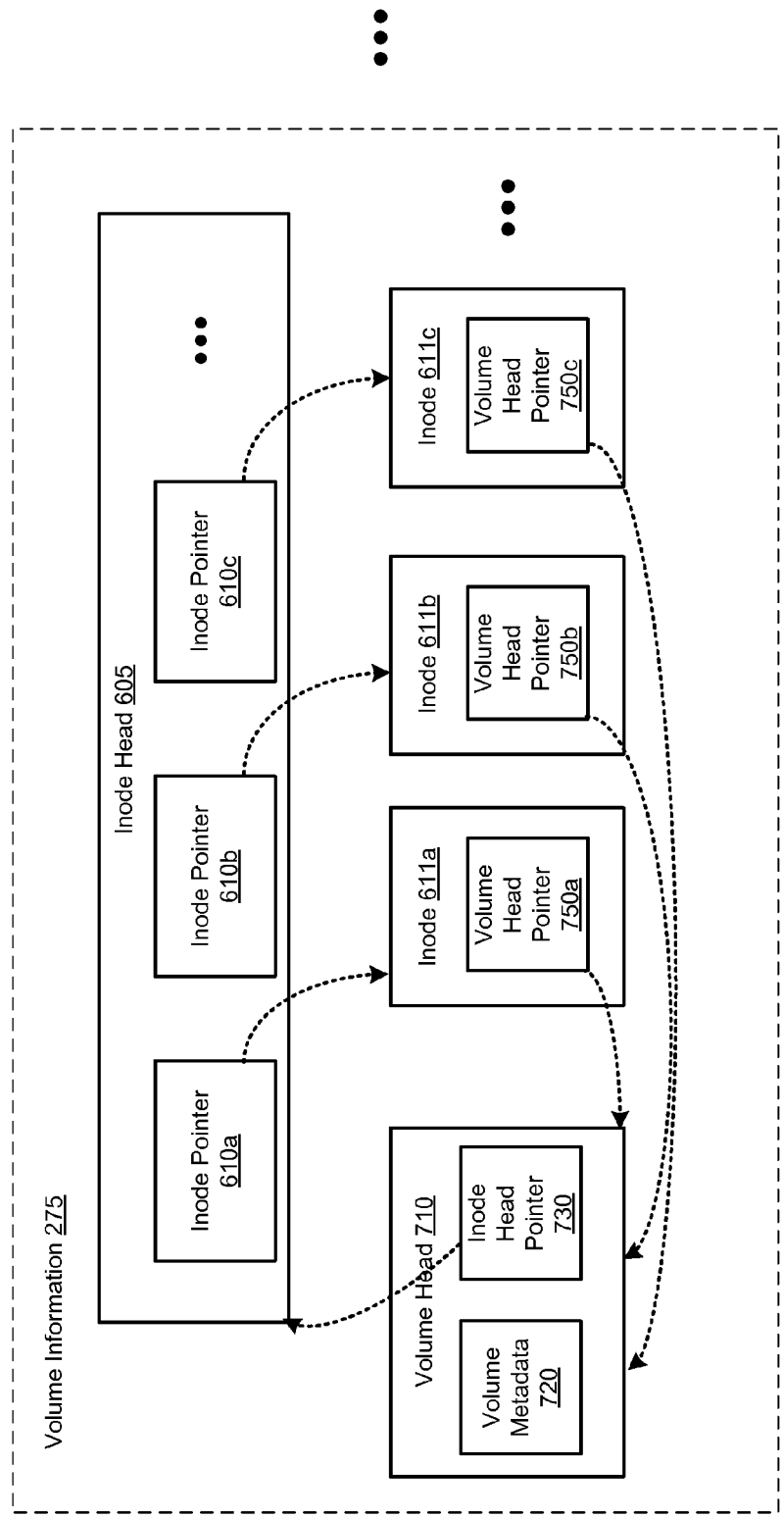
FIG. 7 is a conceptual diagram of a conventional invalidation walk-through of inodes of a volume in memory.

FIG. 7 is a conceptual diagram of a conventional invalidation walk-through of inodes of a volume stored in memory 240. As discussed above, the file system 350 may load and store volume information 275 for one or more volumes to the memory 240 of the storage system. For each volume, volume information 275 may comprise a volume head 710, an inode head 605, and inodes 611 (such as 611a, 611b, etc.) of the volume. The volume head 710 may comprise volume metadata 720 and an inode head pointer 730. The volume metadata 720 may comprise metadata describing the volume, such as a volume identifier, file system identifier, type of volume, storage size of the volume, volume level identifier, current state of the volume, type of buffer trees, and other metadata describing a volume. Typically, a sub-portion of the volume metadata 720 (referred to as "walk-through" metadata) may be needed to perform the invalidation walk-through of inodes of a volume. The inode head pointer 730 may comprise a pointer to the inode head 605 for locating the inode head 605.

The inode head 605 comprises a list of inodes 611 of the volume that can be used to locate the inodes of the volume during the invalidation walk-through of the inodes. The inode head 605 comprises inode pointers 610 (such as 610a, 610b, etc.) to the inodes 611 of the volume, the inode pointers 610 being used for locating the inodes 611 (such as 611a, 611b, etc.). Each inode 611 may contain a volume head pointer 750 (such as 750a, 750b, etc.) comprising a pointer to the volume head 710 for locating the volume head 710. For example, the volume head pointer 750 may be stored to a metadata section of each inode 611.

In some situations, after a volume has been loaded into storage system memory 240, the volume may need to be removed (invalidated) from memory 240, typically during a transfer of the ownership of the volume to another storage system. For example, node A may take ownership of the volumes of failed node B and load the volume information for the volumes into memory. Note that node B also may not have failed, but was intentionally taken offline for upgrading, maintenance, etc. After node B is repaired or otherwise comes back online, ownership of the volumes need to be transferred back to node B from node A through a "giveback procedure" so that node B can begin serving data for the volumes. Since node A no longer services data for the volumes, the volume information for the volumes stored in the memory of node A is no longer needed and may be removed (invalidated) to free up memory space. Typically, node B can begin serving data for the volumes only after the giveback procedure is completed, but the volume information from the memory of node A must be removed for the giveback procedure to be completed. As such, the procedures for removing the volume information from the memory of node A is time critical as node B cannot own the volumes and begin serving data for the volumes (bring the volumes online) until after completion.

Typically, removing the volume information from memory 240 involves a "walk-through" of the inodes 611 of the volume. During the walk-through procedure, all inodes 611 (and thereby data blocks) of the volume that are currently stored in memory 240 are each located and removed (invalidated) using the inode head 605 and the volume metadata 720 of the volume head 710. After the walk-through procedure is completed (and all the inodes of the volume are invalidated in memory 240), the volume head 710 and the inode head 605 is then removed (invalidated) from memory 240 as well. Typically, the file system 350 only allows the invalidation walk-through procedure to be deemed completed after the volume head 710 is removed from memory 240. Also, the file system 350 typically only allows a primary procedure (e.g., giveback procedure) to be deemed completed after the invalidation walk-through procedure is completed and the volume head 710 is removed from memory 240. The volume now owned by node B, cannot be brought online by node B until node A completes the walk-through procedure and primary procedure sends a "completion" message to node B indicating that the primary procedure has been completed.

Previously, the memory size of a storage system/node was relatively small so that only a small number of the inodes 611 of a volume may be stored in memory at any given time. Due to reduced costs, however, the storage size of storage system memories are increasingly becoming larger so that a larger number of inodes of a volume may be stored in memory at any given time. Thus, the procedures for removing the volume information from memory are increasingly taking longer, which increases the time that the volume is offline and data cannot be accessed from the volume. As such, there is a need for a more efficient system and method for removing volume information from storage system memory.

III. Invalidation Deferment Procedure

A. Invalidation Engine Overview

In the embodiments described herein, for illustrative purposes only, a volume is removed (invalidated) from storage system memory 240 upon ownership transfer of the volume to another storage system during a giveback procedure. In other embodiments, however, a volume is removed from storage system memory 240 during any other type of procedure needing volume removal from a storage system memory 240. The giveback procedure and other types of procedures needing volume removal from storage system memory 240 are referred to herein as the "primary procedure."

For example, a primary procedure may comprise a load balance procedure, whereby a volume is removed from memory 240 when volumes are transferred between nodes of a cluster to balance the load between the nodes with minimal disruption. For example, the load on the nodes of a cluster may be balanced to re-distribute load after adding one or more new nodes to the cluster, to improve performance and response time for users/clients/servers, to reduce processing burden on an overloaded node, or to meet a service-level agreement with users/clients/servers performing mission-critical work. For example, node A may have too much workload while node B is not busy with a low workload. A workload balance procedure may transfer one or more volumes owned by node A to node B, whereby the one or more volumes are removed from node A's memory.

For example, a primary procedure may comprise an aggregate relocation procedure for reducing outages during negotiated takeovers to provide non-disruptive software upgrades. For example, a primary procedure may comprise a multistore (or vFiler) migration procedure from one storage controller head to another storage controller head for reducing time needed for the migration to make it less disruptive to client applications. For example, a primary procedure may comprise a "Non-Disruptive Volume Move" procedure for reducing the cutover time, the procedure used for example, to move volumes from a high performance storage device to a low performance storage device or vice-versa. In other embodiments, other primary procedures may be used.

A primary procedure may or may not include the ownership transfer of the volume to another storage system. Each primary procedure may comprise a variety of different steps depending on the particular procedure. The varying steps of different primary procedures are well known in art and are not discussed in detail here. The primary procedure may include as a sub-procedure an invalidation deferment procedure of a volume (described in Section III). In some embodiments, after the primary procedure is completed (along with the invalidation deferment procedure), an invalidation walk-through procedure is performed (described below in Section IV).

As described herein, a first node (e.g., node A) may comprise a node executing the invalidation procedure on a volume stored in its memory 240. A second node (e.g., node B) may comprise another node to which ownership of the volume is transferred and is configured to bring the volume online (for providing data service for the volume in response to received access requests). The first and second nodes may be configured to perform the primary procedure in conjunction.

As shown in FIG. 4, the file system 350 of the storage operating system 300 may include an invalidation engine 400. In some embodiments, the invalidation engine 400 is configured for invalidating information/data of a storage object (e.g., volume information for a volume) stored in memory 240. Invalidating data in memory frees up the storage space used by the data in memory. For example, invalidating data may comprise entering null values for the data in memory. Invalidating data may sometimes be referred to as removing or deleting the data in memory (e.g., removing a volume in memory). Invalidating data of a storage object stored in memory 240 may be performed whenever the storage object is no longer needed, such as when the storage object is being transferred to another storage system/node. The invalidation engine 400 may comprise a invalidation deferment engine 410 and a invalidation walk-through engine 420.

In some embodiments, the invalidation deferment engine 410 is configured for deferring an invalidation walk-through procedure for a volume until after the primary procedure is deemed complete and marking/indicating the volume as "stale" in memory 240. In these embodiments, marking the volume as stale prevents the data from being accessed, and thus allows execution of the invalidation walk-through procedure to be deferred to a later time (e.g., as a background procedure). Deferring the invalidation walk-through procedure for the volume allows the volume to be brought online on another storage system (node B) quickly, before the invalidation walk-through procedure is completed for the volume on node A. The invalidation walk-through engine 420 is configured for performing an invalidation walk-through procedure for a volume in memory 240.

Also, during the invalidation deferment procedure, the storage operating system 300 of node A may produce a "completion message" indicating that the primary procedure has been completed for the volume, and then send the completion message to the storage system to which ownership of the volume is transferred (node B). In some embodiments, the storage operating system 300 of node A may send the completion message to node B before the invalidation walk-through procedure for the volume is actually completed by node A and the inodes of the volume have been removed from the memory 240 of node A. In these embodiments, in response to receiving the completion message, node B begins serving data for the transferred volume and responds to any received access requests for data of the volume (i.e., brings the volume online). As such, node B may bring the volume online and serve data of the volume before the invalidation walk-through for the volume is actually completed by node A, and thus before the inodes of the volume have been removed from the memory 240 of node A.

B. Invalidation Deferment Engine Overview

In the embodiments described below, node A comprises a memory 240 storing volume information for one or more volumes that are no longer and are to be removed. Node A executes a invalidation deferment engine 410 configured for deferring an invalidation walk-through procedure for each such volume. However, deferring the invalidation walk-through procedure of the volume may cause stale/invalid data of the volume to be served to server systems requesting data of the volume from node A. As such, the accessing and serving of stale data of the volume must be prevented by the storage operating system 300 of node A.

The data of the volume may be stored in inodes 611 representing files of the volume. Conventionally, each inode 611 of the volume stored in memory 240 may be located and marked as stale. This method, however, is not time efficient and consumes valuable hardware and software resources of node A. In some embodiments, the invalidation deferment engine 410 is configured for marking each volume as stale, rather than the individual inodes 611 of each volume. In this manner, each volume can be marked as stale quickly and efficiently. As such, only a single indicator for each volume needs to be configured to show that the volume, which will effectively indicate that each inode 611 (and thus the data blocks) of the volume are stale. In these embodiments, marking the volume as stale prevents the data from being accessed and served, and thus allows execution of the invalidation walk-through procedure to be deferred to a later time (e.g., as a background procedure). Indicating that a volume is stale indicates to the storage operating system 300 of node A that data of the volume in memory is no longer current and valid, and is not to be served (returned in response to an access request).

In some embodiments, the storage operating system 300 (e.g., the file system 350) of node A may perform a preparation procedure that is executed prior to the invalidation deferment procedure (executed by the invalidation deferment engine 410) and the invalidation walk-through procedure (executed by the invalidation walk-through engine 420). The preparation procedure may prepare and configure volume information for each volume stored in memory for the deferment and walk-through procedures.

C. Preparation Procedure

Figure 8:
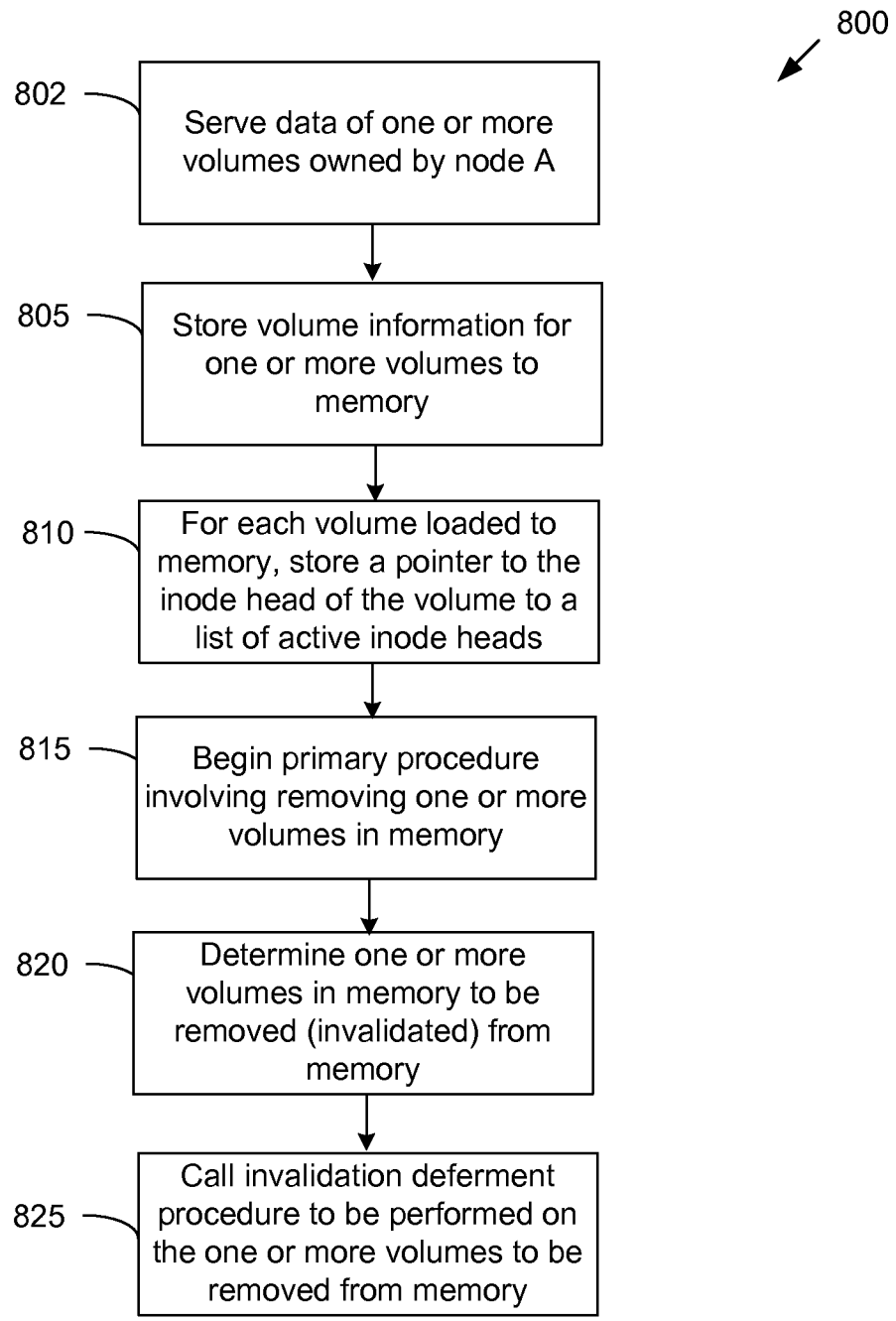
FIG. 8 is a flowchart of a preparation method in accordance with some embodiments.

FIG. 8 is a flowchart of a preparation method 800 in accordance with some embodiments. In some embodiments, some of the steps of method 800 are performed or caused to be performed by a storage operating system 300 executing on node A 120. For example, the storage operating system 300 may comprise a file system layer 350 configured to perform steps of the method 800. The order and number of steps of the method 800 are for illustrative purposes only and, in other embodiments, a different order and/or number of steps are used.

The method 800 begins by accessing and serving (at step 802) data of one or more volumes "owned" by node A, the one or more volumes stored to one or more storage devices 125. The method 800 loads and stores (at step 805) volume information for the one or more volumes to memory 240. For example, the volume information for a volume may be loaded to memory 240 upon receiving an access request, from a server system 110, for data of the volume. The volume information for a volume may be retrieved from one or more storage devices 125 that store the volume.

Figure 9:
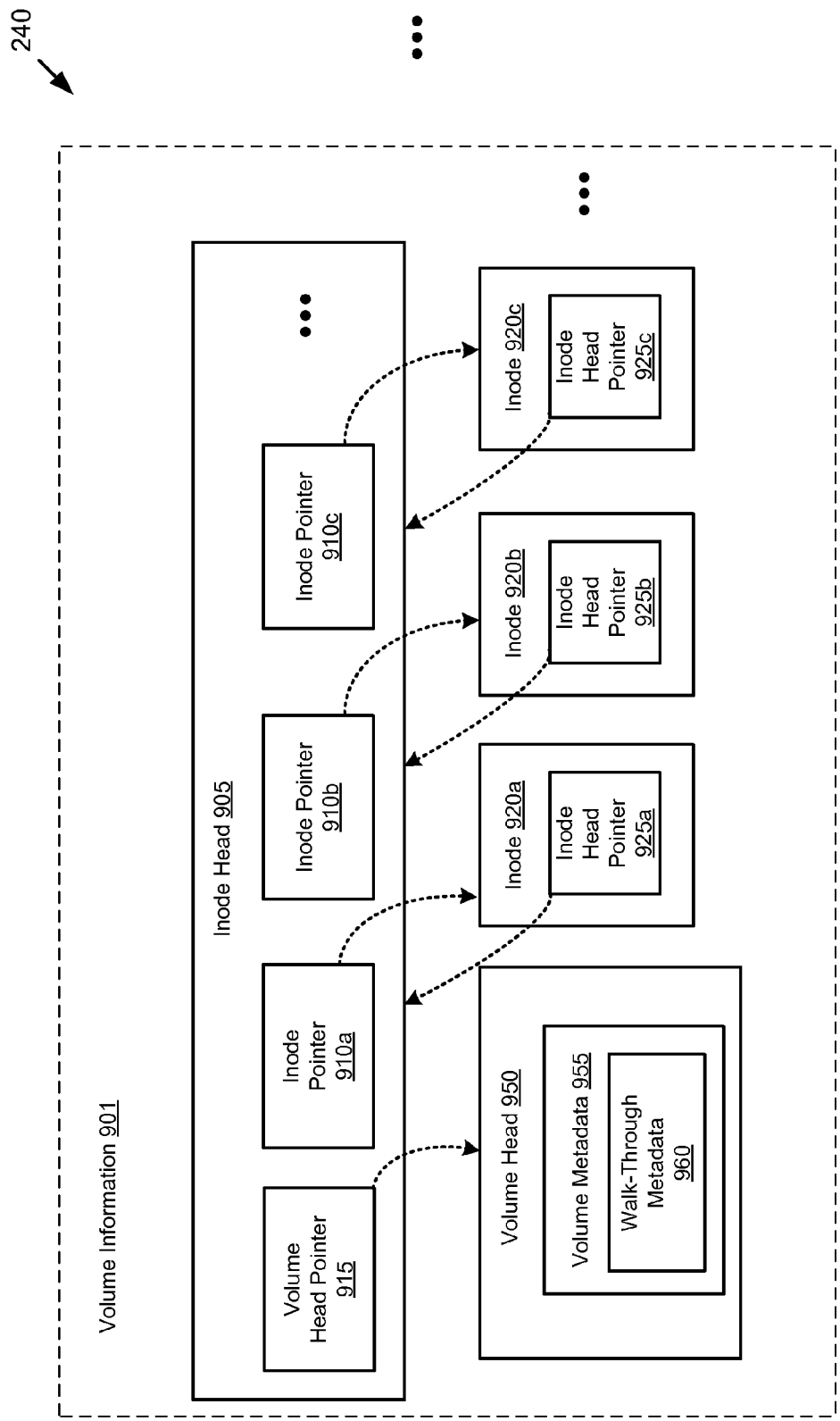
FIG. 9 shows a conceptual diagram of volume information for a volume that is stored to memory, in accordance with some embodiments.

FIG. 9 shows a conceptual diagram of volume information 901 for a volume that is stored to memory 240, in accordance with some embodiments. As shown in FIG. 9, for each volume loaded into memory 240 of node A, volume information 901 may comprise a volume head 950, inode head 905, and one or more inodes 920 (such as 920a, 920b, etc.) of the volume.

The volume head 950 may comprise volume metadata 955. The volume metadata 955 may comprise metadata describing the volume, such as a volume identifier, file system identifier, type of volume, storage size of the volume, volume level identifier, current state of the volume, and other metadata describing a volume. A sub-portion of the volume metadata 955 (referred to as "walk-through" metadata 960) may be used by the invalidation walk-through engine 420 to perform the invalidation walk-through of the volume.

The inode head 905 comprises a list of inodes 920 of the volume comprising inode pointers 910 (such as 910a, 910b, etc.) to the inodes 920 of the volume, the inode pointers 910 being used for locating the inodes 920 (such as 920a, 920b, etc.). In some embodiments, each inode head 905 is configured by the storage operation system 300 to also store a volume head pointer 915 for locating the volume head 950.

Each inode 920 may represent a file in the volume. Components of each inode 920 are described in relation to FIG. 6, and are not discussed in detail here. For example, an inode 920 may comprise a data structure comprising file metadata, pointers to indirect blocks or data blocks, and data blocks containing the actual data of the file. An inode 920 may comprise a data structure comprising a root level inode, zero or more indirect blocks (containing pointers to data blocks or other indirect blocks), and one or more data blocks. In some embodiments, each inode 920 is configured by the storage operation system 300 to also store a pointer to the inode head (instead of a pointer to the volume head). The inode head pointers 925 (such as 925a, 925b, etc.) are used for locating the inode head 905.

For each volume loaded to memory 240, the method 800 then stores (at step 810) a pointer to the inode head of the volume to a list of "active" inode heads 290 in memory 240. In these embodiments, the storage operating system 300 manages a list of active inode heads 290 and a list of stale inode heads 295. The list of active inode heads 290 comprises a list of inode heads of "active" volumes that are still valid and are not to be removed from memory 240. For example, the list of active inode heads 290 may comprise pointers to the inode heads of active volumes. The list of stale inode heads 295 comprises a list of inode heads of stale volumes that are no longer valid and are to be removed from memory 240. For example, the list of stale inode heads 295 may comprise pointers to the inode heads of stale volumes.

The method 800 then begins (at step 815) a primary procedure that involves removing one or more volumes in memory 240. In some embodiments, the primary procedure comprises a giveback procedure. In other embodiments, the primary procedure comprises a different type of procedure requiring removal of a volume from memory 240. The method 800 then determines (at step 820) one or more volumes in memory 240 that are no longer needed and are to be removed (invalidated) from memory 240 as part of the primary procedure.

In some situations, after a volume has been loaded into storage system memory, the volume may need to be removed (invalidated) from memory during a primary procedure. The primary procedure may involve an ownership transfer of the volume to another storage system. To illustrate, the primary procedure may comprise a giveback procedure. For example, node A may take ownership of the volumes of failed node B and load the volume information for the volumes into memory. After node B is repaired and comes back online, ownership of the volumes need to be transferred back to node B from node A through a "giveback procedure" so that node B can begin serving data for the volumes. Since node A no longer services data for the volumes, the volume information for the volumes stored in the memory of node A may be removed (invalidated) to free up memory space.

Typically, node B can begin serving data for the transferred volumes only after it receives a completion message indicating that the primary procedure (e.g., giveback procedure) is completed. However, typically the volume information from the memory of node A must be removed for the primary procedure to be deemed completed by node A. As such, the procedures for removing the volume information from the memory of node A is time critical as node B cannot begin serving data for the volumes (bring the volumes online) until after completion. Typically, removing the volume information from the memory of node A involves a invalidation walk-through of the inodes of the volume. In some embodiments herein, however, node B begins to serve data of the transferred volumes before the inodes of the volume are removed from the memory of node A. In these embodiments, node A deems the primary procedure for a volume to be complete and sends the completion message to node B before the inodes of the volume are removed from the memory of node A.

The method 800 then calls (at step 825) the invalidation deferment procedure to be performed on the one or more volumes to be removed from memory 240. The method 800 then ends.

D. Invalidation Deferment Procedure

Figure 10:
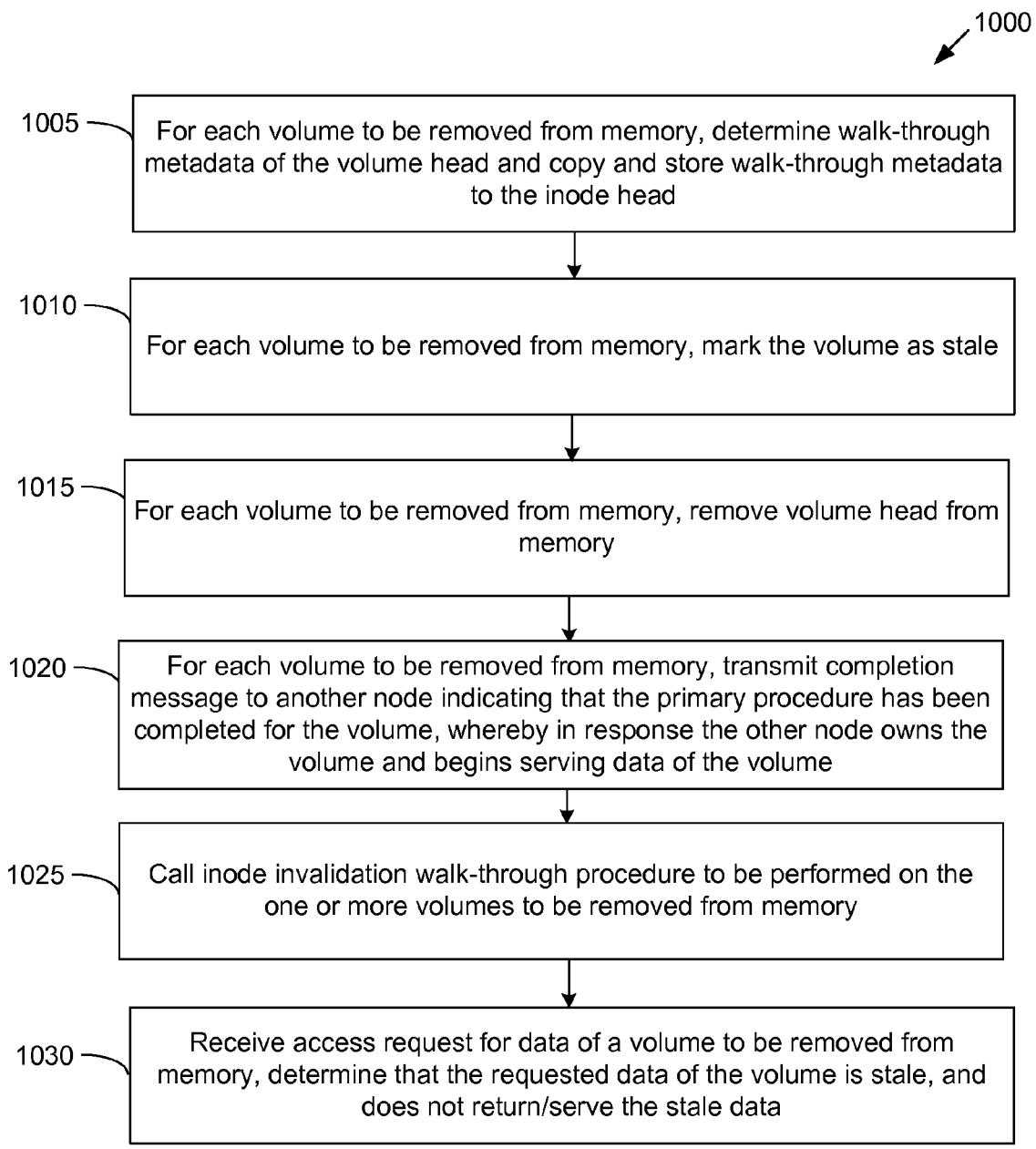
FIG. 10 is a flowchart of an invalidation deferment method in accordance with some embodiments.

FIG. 10 is a flowchart of an invalidation deferment method 1000 in accordance with some embodiments. In some embodiments, some of the steps of method 1000 are performed or caused to be performed by a storage operating system 300 executing on node A 120. For example, the storage operating system 300 may comprise a file system layer 350 and a invalidation deferment engine 410 configured to perform steps of the method 1000. The order and number of steps of the method 1000 are for illustrative purposes only and, in other embodiments, a different order and/or number of steps are used. The method 1000 may be performed for each volume to be removed from memory 240.

Figure 11:
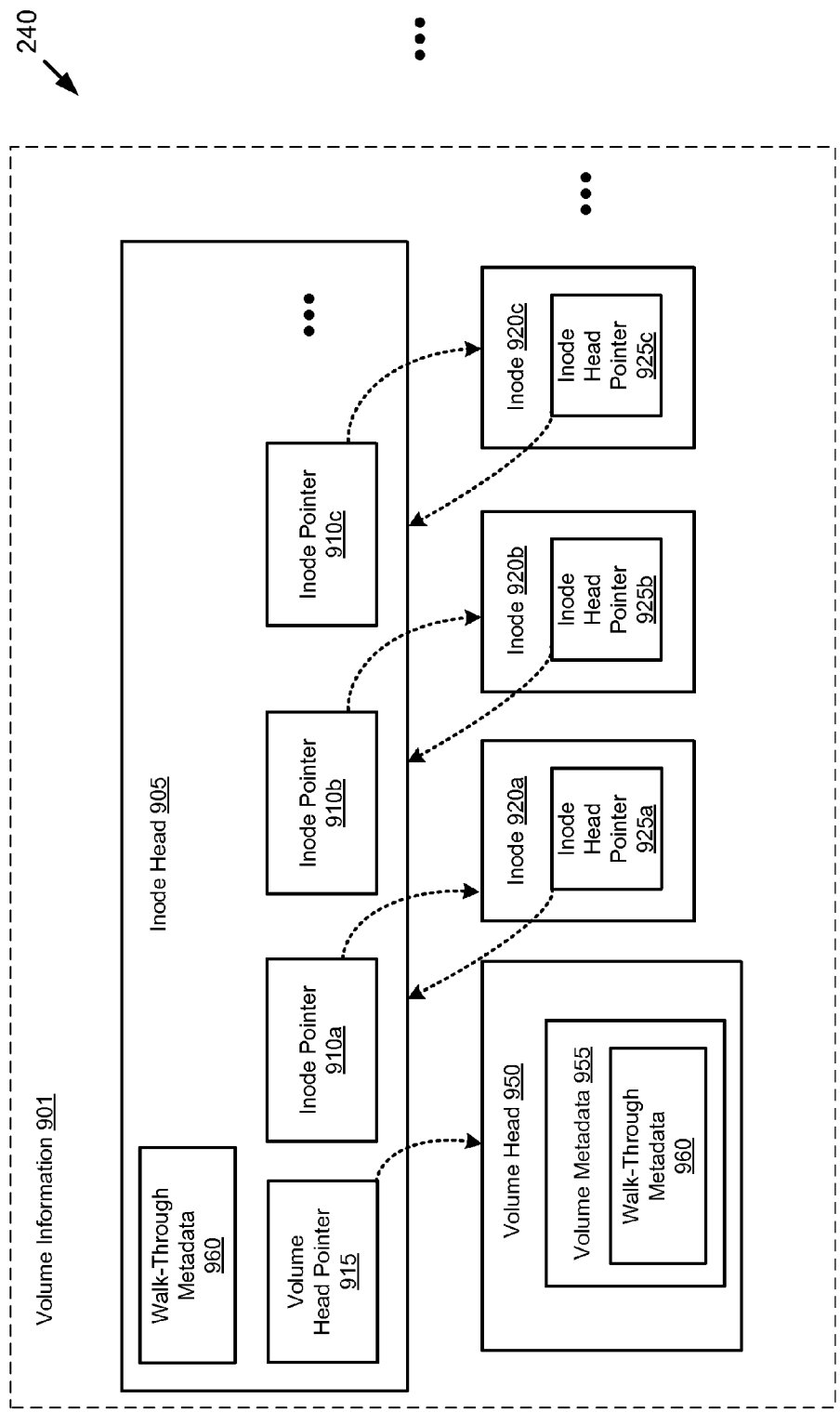
FIG. 11 shows a conceptual diagram of walk-through metadata stored to the inode head.

For each volume to be removed from memory 240, the method 1000 determines (at 1005) the volume metadata 955 stored in the volume head 950 that comprises walk-through metadata 960, copies the walk-through metadata 960 from the volume head 950, and stores the walk-through metadata 960 to the inode head 905. The walk-through metadata 960 comprises a sub-portion of the volume metadata 955 that is used by the invalidation walk-through engine 420 to perform a later invalidation walk-through procedure for the volume. For example, the method 1000 may do so by storing, to memory 240, a list of walk-through metadata (e.g., volume level identifier, type of volume, type of buffer trees used by the inodes, etc.) and determining that any volume metadata 955 matching metadata on the list comprises walk-through metadata 960. FIG. 11 shows a conceptual diagram of walk-through metadata 960 that has been copied from the volume head 950 and stored to the inode head 905.

Figure 12:
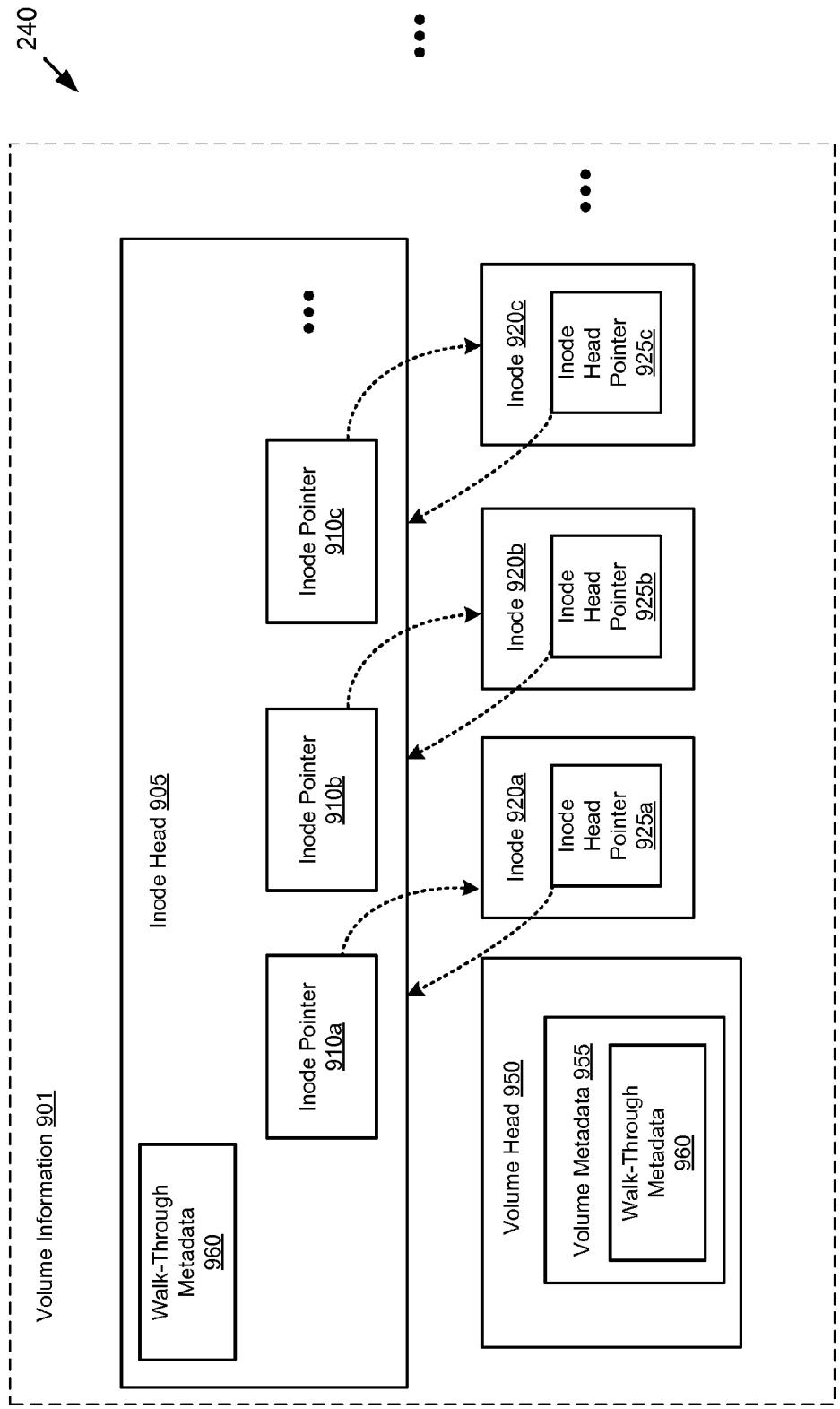
FIG. 12 shows a conceptual diagram of a volume head pointer removed from the inode head of a volume.

For each volume to be removed from memory 240, the method 1000 then indicates/marks (at step 1010) the volume as stale. In some embodiments, marking a volume as stale thereby marks all volume information 901 (volume head 950, inode head 905, and inodes 920) stored in memory as stale. In some embodiments, the method 1000 may indicate that a volume is stale by removing the volume head pointer 915 from the inode head 905 of the volume. FIG. 12 shows a conceptual diagram of the volume head pointer 915 removed from the inode head 905 of the volume information 901 of the volume. For example, the method 1000 may do so by entering null values for the volume head pointer 915 in the inode head 905.

In some embodiments, an inode head 905 that does not comprise a volume head pointer 915 indicates that the volume and its inodes 920 stored in memory 240 are stale, and thus are not to be accessed and served. Overall, removing the volume head pointer 915 from the inode head 905 thereby marks all volume information 901 (volume head 950, inode head 905, and inodes 920) of the volume stored in memory as stale. In these embodiments, upon receiving an access request for data of a volume, the storage operating system 300 is configured to determine whether the inode head 905 of the volume comprises a volume head pointer 915 to determine if the data for the volume stored in memory 240 is stale (as discussed below).

As such, by simply removing the volume head pointer 915 from the inode head 905, all inodes 920 of a volume may be quickly and efficiently marked as stale. Thus, a time and resource consuming walk-through of the inodes does not need to be performed, whereby each inode 920 of the volume is individually located and marked. Note that in a walk-through of the inodes, each data block/buffer of each inode would also need to be individually located and marked, which is especially time and resource consuming.

Figure 13:
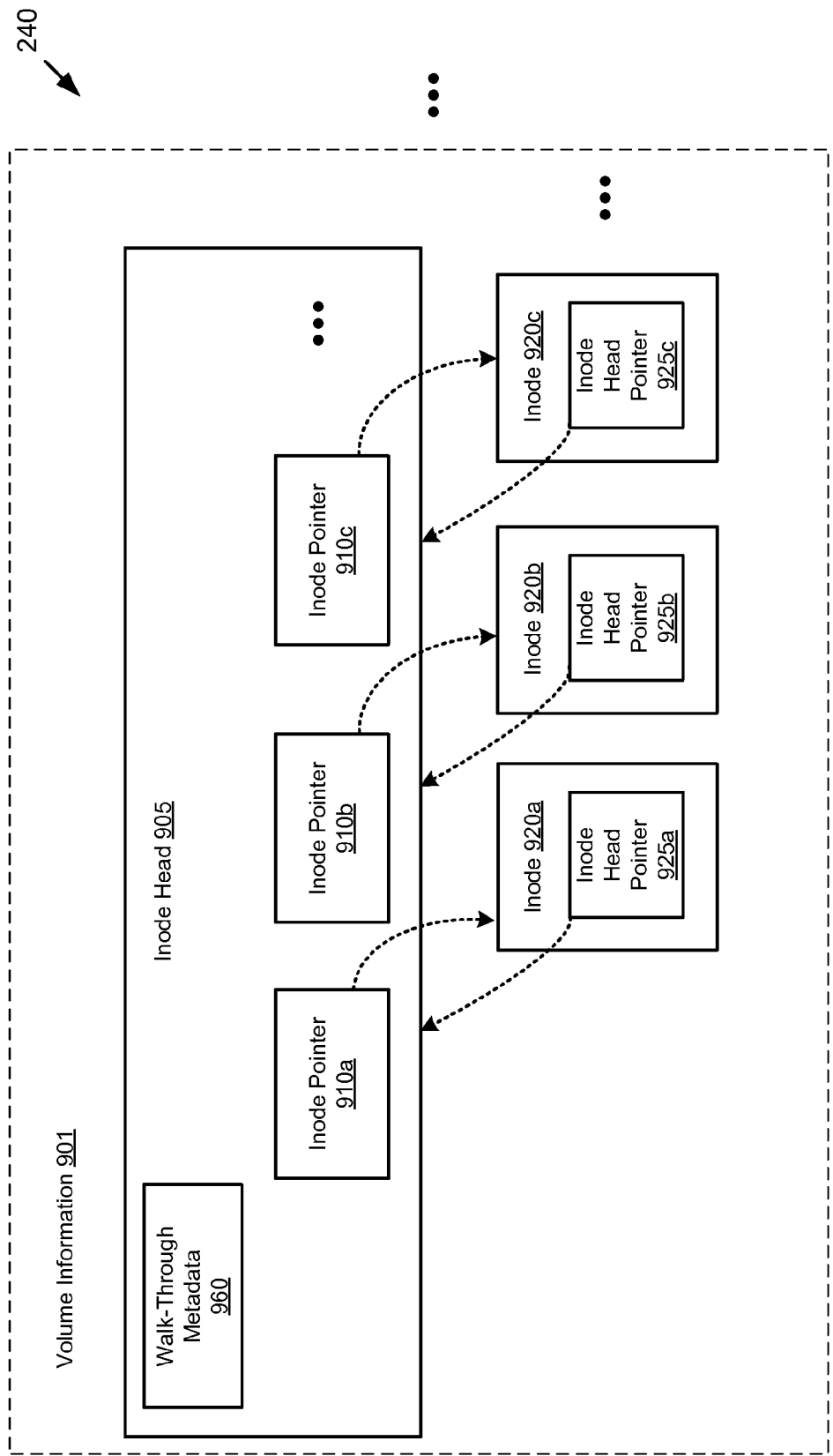
FIG. 13 shows a conceptual diagram of a volume head removed from a volume.

For each volume to be removed from memory 240, the method 1000 then removes (at step 1015) the volume head 950 from memory 240. FIG. 13 shows a conceptual diagram of the volume head 950 removed from the volume information 901 of a volume. For example, the method 1000 may do so by entering null values for the volume head 950. Since the walk-through metadata 960 of the volume head 950 was already stored to the inode head 905 (at step 1005) and the volume head pointer 915 was already removed from the inode head 905 (at step 1005), the volume head 950 is no longer required and may be removed from memory 240. Thus the memory space of the volume head 950 may be freed immediately.

For each volume to be removed from memory 240, the method 1000 then determines that the primary procedure is complete and transmits/sends (at step 1020) a completion message to node B indicating that the primary procedure has been completed for the volume and node B now owns the volume. In response to receiving the completion message, node B owns the volume and begins serving data of the volume. The method 1000 then calls (at step 1025) the inode invalidation walk-through procedure to be performed on the one or more volumes to be removed from memory 240. Note that most storage operating systems and file systems are configured to allow the primary procedure to be deemed/determined complete for a volume only after the volume head 950 of the volume is removed from memory 240. As such, after the volume head 950 for a volume is removed from memory 240, the method 1000 may deem the primary procedure for the volume complete and transmit the completion message for the volume to node B.

In some embodiments, for each volume to be removed, the above steps of the method 1000 are executed before the invalidation walk-through procedure is performed and completed for the volume and the inodes of the volume are removed from the memory of node A. In some embodiments, for each volume to be removed from memory 240, the walk-through metadata 960 of the volume head 950 is stored to the inode head 905. This allows the volume head 950 to be removed from memory 240 (at step 1015) before the invalidation walk-through procedure is completed, which in turn allows the storage operating system 300 to determine that the primary procedure is complete (at step 1020) before the invalidation walk-through procedure is completed. This in turn allows the storage operating system 300 to send the completion message to node B (at step 1020) before the invalidation walk-through procedure is completed, which in turn allows node B to begin serving data for the volume before the invalidation walk-through procedure is completed and the inodes of the volume are removed from the memory of node A. As such, the embodiments herein allow the node B to bring transferred volumes online and begin serving data for the volumes quickly with less time delay.

In some embodiments, the method 1000 then receives (at step 1030) an access request for data of a volume to be removed from memory 240, determines that the requested data of the volume is stale, and does not serve/return the stale data. As known in the art, an access request may specify a volume identifier and a file identifier for the requested data. The storage operating system 300 may map (e.g., using a hash function and hash table) the volume identifier and file identifier to an address location of a corresponding inode in memory, the corresponding inode containing the requested data. The storage operating system 300 may then locate, in memory 240, the corresponding inode containing the requested data using the address location.

In some embodiments, the storage operating system 300 then uses the inode head pointer 925 stored in the corresponding inode 920 to locate the inode head 905 for the requested volume. The storage operating system 300 then determines that the inode head 905 does not comprise a volume head pointer 915 (e.g., comprises null values) indicating that the requested volume and all its inodes 920 stored in memory 240 are stale. As such, the storage operating system 300 does not serve the requested data (e.g., sends an "invalid request" message to the requesting client or server system). The method 800 then ends.

IV. Invalidation Walk-Through Procedure

A. Invalidation Walk-Through Engine Overview

In some embodiments, after the primary and invalidation deferment procedures are completed, an invalidation walk-through procedure is performed (by the invalidation walk-through engine 420) on each volume to be removed from memory 240. Although the invalidation walk-through has been delayed by the invalidation deferment procedure, the inodes of each volume still needs to be located and removed from memory 240. This procedure may still require a significant amount of time depending on the number of inodes stored in memory 240. However, this is mitigated by several factors. First, node B is not waiting on the invalidation walk-through procedure to be completed to bring the volumes online, since the volumes have already been brought online by node B during the invalidation deferment procedure. Second, the data of each volume has already been marked as stale, so there is no risk of stale data being served while the invalidation walk-through procedure is performed. Third, in some embodiments, since the invalidation walk-through procedure is a background procedure, multiple threads may be used to perform the invalidation walk-through procedure in parallel (simultaneously).

In some embodiments, for each volume to be removed from memory 240, the invalidation walk-through procedure is performed to remove inodes of the volume from memory 240 after the primary procedure for the volume is deemed/determined to be complete. In other embodiments, the invalidation walk-through procedure for a volume is performed after the completion message for the volume is sent to node B. In further embodiments, the invalidation walk-through procedure for a volume is performed after node B begins serving data for the volume.

In some embodiments, each volume to be removed from memory 240 is represented and listed on a list of stale inode heads 295. For example, for each volume to be removed from memory 240, the inode head 905 of the volume may be listed on the list of stale inode heads 295. The storage operating system may manage the list of stale inode heads 295 to determine which volumes to remove from memory 240 during the invalidation walk-through procedure. In some embodiments, multiple threads may be used to perform the invalidation walk-through procedure on multiple volumes in parallel (simultaneously).

In some embodiments, for each volume to be removed from memory 240, the invalidation walk-through procedure is performed using walk-through metadata 960 stored to the inode head 905 of the volume. The walk-through metadata 960 may comprise volume metadata 955 that was transferred from the volume head 950 of the volume prior to its removal from memory 240.

In some embodiments, for each volume to be removed from memory 240, the invalidation walk-through procedure is performed using the inode head 905 of the volume. In these embodiments, for each volume to be removed from memory 240, the invalidation walk-through procedure is performed without using the volume head 950 of the volume, whereby the volume head 950 has already been removed from memory 240.

B. Invalidation Walk-Through Procedure

Figure 14:
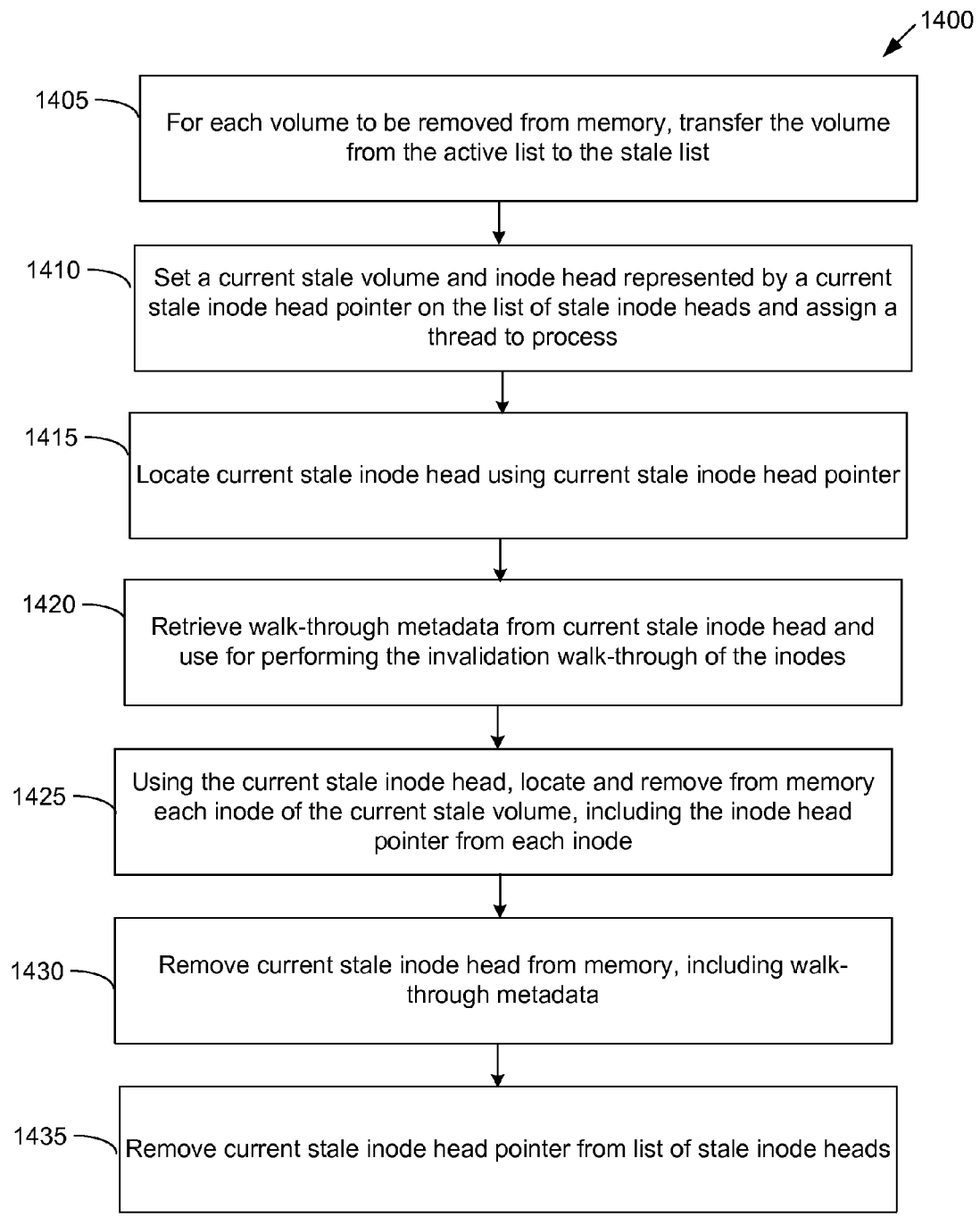
FIG. 14 is a flowchart of an invalidation walk-through method in accordance with some embodiments.

FIG. 14 is a flowchart of an invalidation walk-through method 1400 in accordance with some embodiments. In some embodiments, some of the steps of method 1400 are performed or caused to be performed by a storage operating system 300 executing on node A 120. For example, the storage operating system 300 may comprise a file system layer 350 and a invalidation walk-through engine 420 configured to perform steps of the method 1400. The order and number of steps of the method 1400 are for illustrative purposes only and, in other embodiments, a different order and/or number of steps are used.

Figure 15:
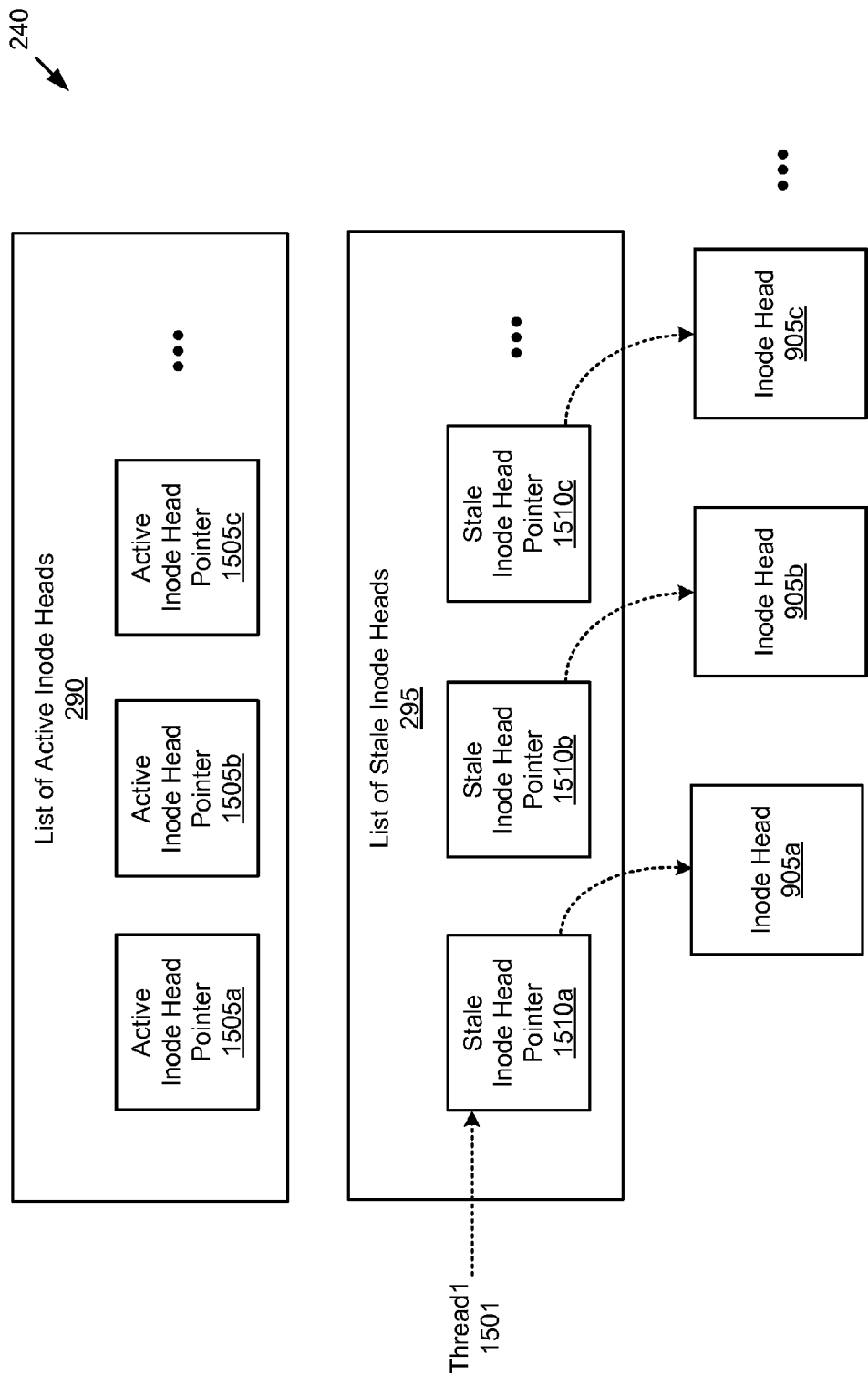
FIG. 15 shows an exemplary conceptual diagram of a list of active inode heads and the list of stale inode heads.

For each volume to be removed from memory 240, the method 1400 transfers (at step 1405) the volume from the list of "active" inode heads 290 to the list of "stale" inode heads 295 by removing the pointer to the inode head of the volume from the active list 290 and storing the pointer to the stale list 295. FIG. 15 shows an exemplary conceptual diagram of the list of active inode heads 290 and the list of stale inode heads 295 stored in memory 240. The list of active inode heads 290 comprises a list of inode heads of "active" volumes that are still valid and are not to be removed from memory 240. The list of stale inode heads 295 comprises a list of inode heads of stale volumes that are no longer valid and are to be removed from memory 240. As shown in the example of FIG. 15, the list of active inode heads 290 comprises pointers 1505 (such as 1505a, 1505b, etc.) to the inode heads 905 of active volumes (referred to as active inode head pointers 1505) and the list of stale inode heads 295 comprises pointers 1510 (such as 1510a, 1510b, etc.) to the inode heads 905 of stale volumes (referred to as stale inode head pointers 1510). The active inode head pointers 1505 represent active inode heads and active volumes and the stale inode head pointers 1510 represent stale inode heads and stale volumes.

The method 1400 then sets (at step 1410) a current stale volume and inode head represented by a current stale inode head pointer 1510 (specified on the list of stale inode heads 295) and assigns a processing thread to process the current stale volume and inode head. As shown in the example of FIG. 15, the method 1400 may set a first stale volume and inode head 905a represented by a first stale inode head pointer 1510a as the current stale volume and inode head and current stale inode head pointer, and assign a first thread 1501 to process the current stale volume and inode head. The first thread 1501 may be executed by a first processor. In some embodiments, the current stale inode head is oldest stale inode head specified in the list of stale inode heads 295, whereby the stale inode heads specified in the list of stale inode heads 295 are processed by first-in first-out (FIFO) order. In other embodiments, the stale inode heads specified in the list of stale inode heads 295 are processed in a different order. In some embodiments, multiple threads may be assigned to simultaneously process multiple stale inode heads specified in the list of stale inode heads 295, whereby each thread may be executed by a different processor (as discussed further below in relation to FIG. 18). The method 1400 then locates (at step 1415) the current stale inode head 905 using the current stale inode head pointer 1510 (shown conceptually in FIG. 15).

Figure 16:
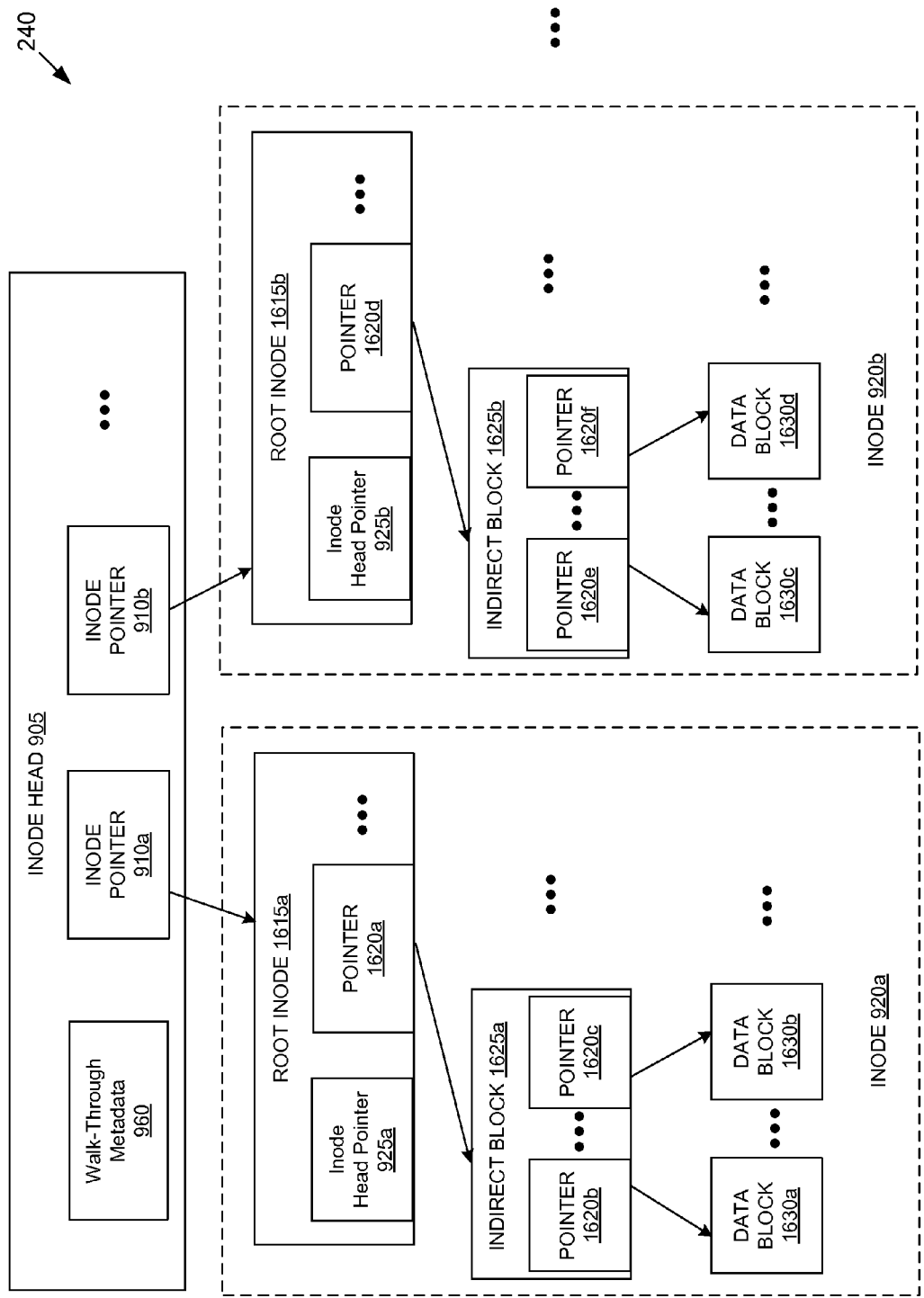
FIG. 16 shows a conceptual diagram of an inode head and various inodes of a volume to be removed from memory, in accordance with some embodiments.

The method 1400 retrieves (at step 1420) the walk-through metadata 960 from the current stale inode head 905. FIG. 16 shows a conceptual diagram of an inode head 905 and various inodes 920 (such as 920a, 920b, etc.) of a volume to be removed from memory 240, in accordance with some embodiments. As shown in FIG. 16, the inode head 905 comprises walk-through metadata 960 that was previously copied from the volume head 950 and stored to the inode head 905.

The method 1400 may use the walk-through metadata 960 to perform the invalidation walk-through of the inodes of the current stale volume and inode head 905. For example, the walk-through metadata 960 may include a volume level identifier comprising multi-processor related metadata. The volume level identifier may be used by the storage operating system 300 to schedule and assign a processor to perform the invalidation walk-through on the current stale volume and inode head 905 concurrently with other tasks on a multiple processor storage system. In some embodiments, the volume level identifier may be used by the storage operating system 300 to schedule a first processor to process a first stale volume and inode head 905 while concurrently scheduling a second processor to process a second stale volume and inode head 905.

As another example, the walk-through metadata 960 may include metadata that may change the manner in which the invalidation walk-through is performed on the current stale volume and inode head 905. For example, the walk-through metadata 960 may specify a type of volume (e.g., flexible, traditional etc.) or the type of buffer trees used by the inodes to store and organize the data blocks of the volume. As known in the art, the type of volume and buffer tress of the volume will change the manner in which the invalidation walk-through is performed on the volume. In other embodiments, the walk-through metadata 960 comprises other volume metadata 955.

Using the current stale inode head 905, the method 1400 then performs (at step 1425) the invalidation walk-through of the inodes 920 of the current stale volume to locate and remove, from memory 240, each inode 920 of the current stale volume. As shown in FIG. 16, the stale inode head 90 comprises inode pointers 910 (such as 910a, 910b, etc.) to all the stale inodes 920 (such as 920a, 920b, etc.) that are to be removed from memory 240. As shown in FIG. 16, each inode 920 may comprise a data structure comprising pointers 1620 (such as 1620a, 1620b, etc.) to indirect blocks 1625 (such as 1625a, 1625b, etc.) or data blocks 1630 (such as 1630a, 1630b, etc.), and data blocks 1630. For example, an inode 920 may comprise a data structure comprising a root level inode 1615 (such as 1615a, 1615b, etc.), zero or more indirect blocks 1625 (containing pointers to data blocks 1630 or other indirect blocks 1625), and one or more data blocks 1630. The root level inode 1615 may comprise pointers 1620 to data blocks or indirect blocks.

Figure 17:
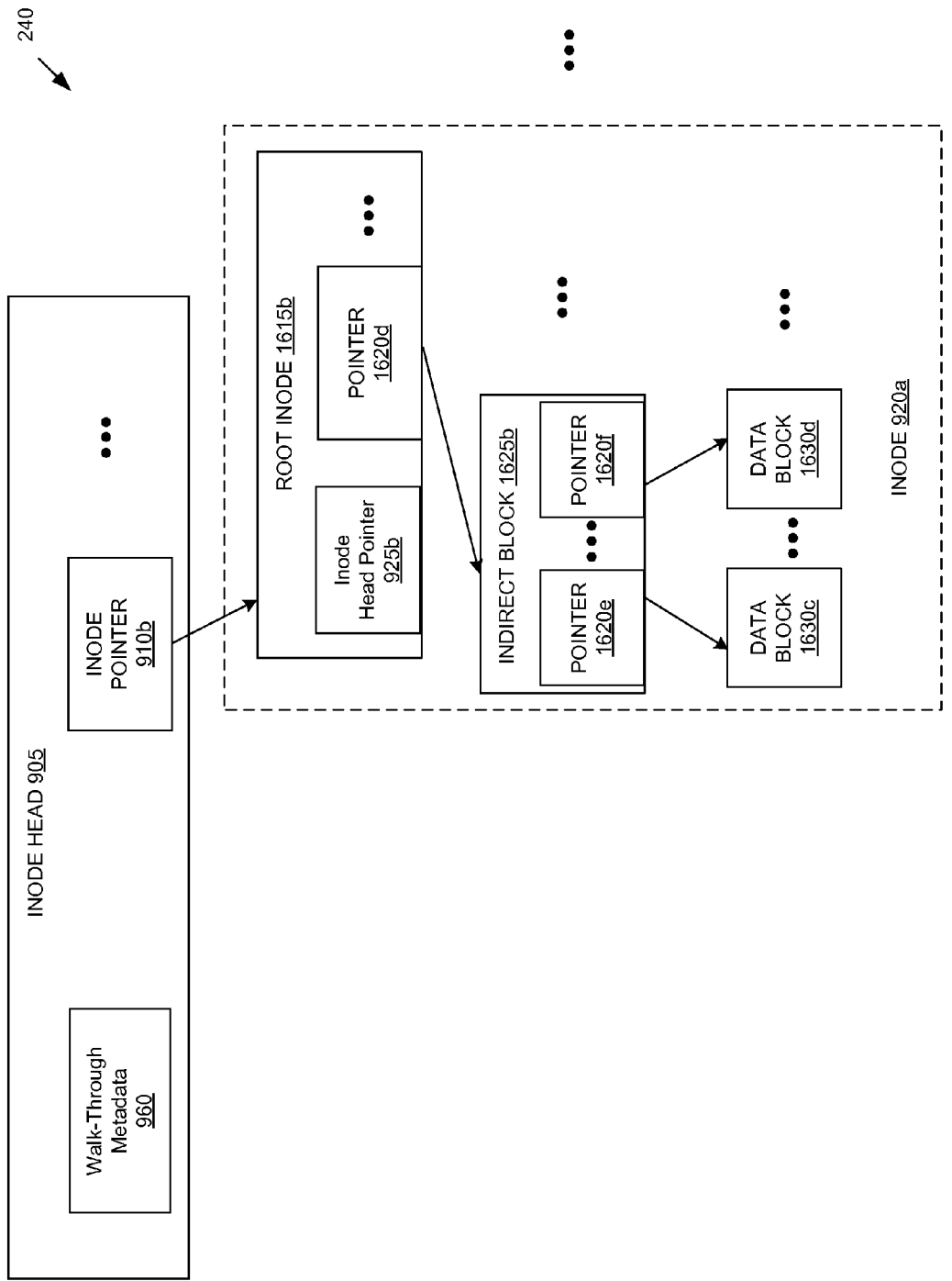
FIG. 17 shows a conceptual diagram of an inode of a stale volume that is removed from memory, in accordance with some embodiments.

As such, the various pointers (e.g., inode pointers 910, pointers 1620, etc.) may be used to locate and invalidate each inode 920 (including all data blocks 1630 of each inode) of the current stale volume stored in memory 240. FIG. 17 shows a conceptual diagram of an inode 920 of a stale volume that is removed from memory 240, in accordance with some embodiments. At step 1425, the method 1400 will invalidate each inode 920 until all inodes 920 of the stale volume are removed from memory 240. In some embodiments, each inode 920 also comprises an inode head pointer 925. In these embodiments, at step 1425, the method 1400 also removes the inode head pointer 925 of each inode 920 from memory 240.

Figure 18:
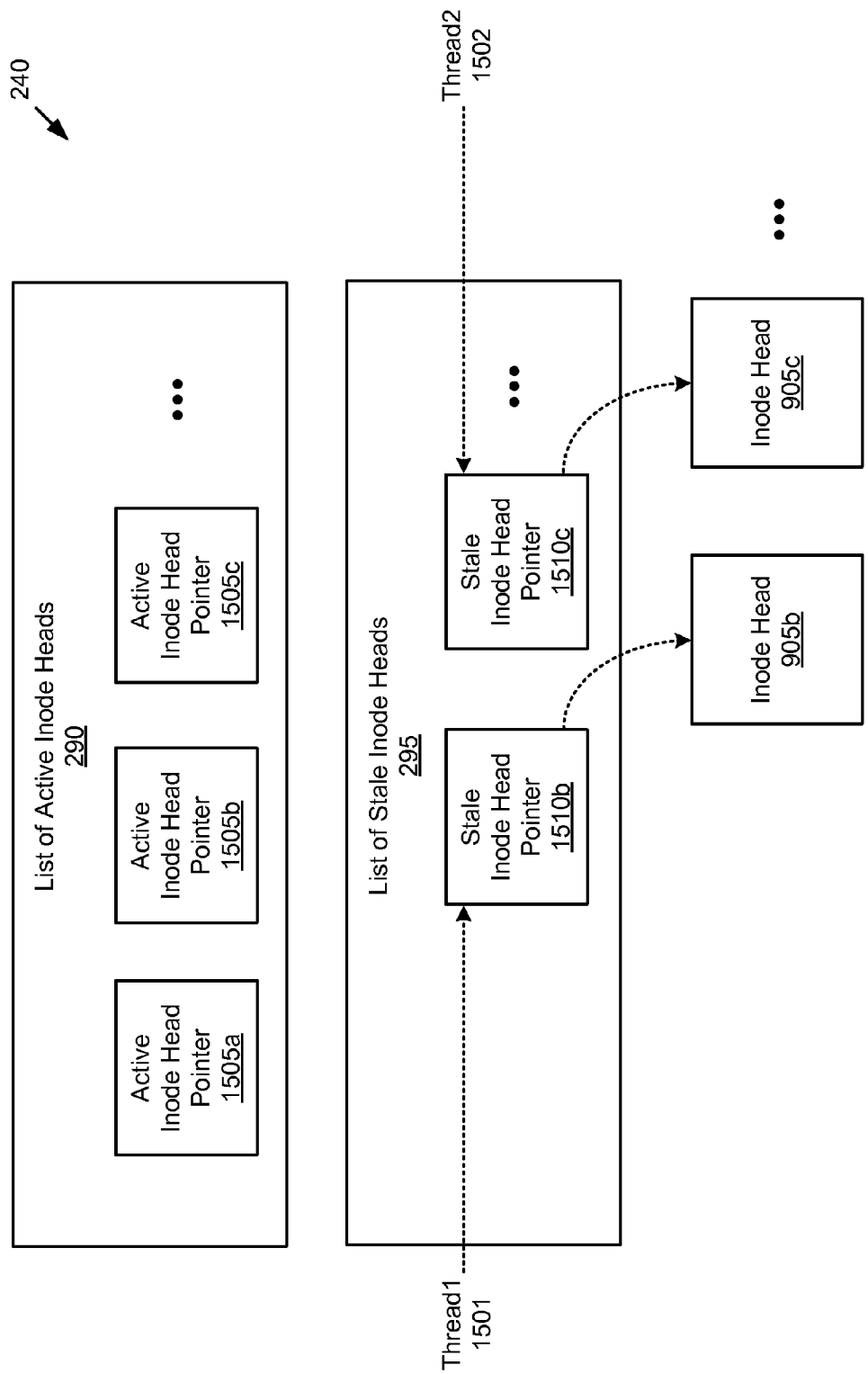
FIG. 18 shows a conceptual diagram of a current stale inode head removed from memory and a current stale inode head pointer removed from the list of stale inode heads.

The method 1400 then removes (at step 1430) the current stale inode head 905 from memory 240. In some embodiments, each inode head 905 comprises walk-through metadata 960. In these embodiments, at step 1430, the method 1400 removes the walk-through metadata 960 from memory 240. The method 1400 then removes (at step 1435) the current stale inode head pointer 1510 from the list of stale inode heads 295. FIG. 18 shows a conceptual diagram of the current stale inode head 905 removed from memory 240 and the current stale inode head pointer 1510 removed from the list of stale inode heads 295.

The method 1400 may be performed for each volume to be removed from memory 240. For example, steps 1410 through 1435 may be repeated for each stale volume and inode head represented by a stale inode head pointer 1510 specified on the list of stale inode heads 295. In some embodiments, multiple threads may be assigned to simultaneously perform the method 1400 on multiple stale volumes and inode heads specified in the list of stale inode heads 295.

For example, as shown in the example of FIG. 18, a first thread 1501 may perform a first walk-through procedure on a first stale volume and inode head while a second thread 1502 simultaneously (in parallel) performs a second walk-through procedure on a second stale volume and inode head. In some embodiments, one or more steps that are performed for the first walk-through procedure overlap (in time) one or more steps that are performed for the second walk-through procedure. As known in the art, a processing thread may comprise a predefined group/set of instructions that a processor executes. The first thread 1501 may be executed by a first processor while the second thread 1502 may be simultaneously (in parallel) executed by a second processor.

In some embodiments, the method 1400 may be performed on each stale volume and inode head represented in the list of stale inode heads 295 using the inode head of the volume. In these embodiments, the method 1400 may be performed on each stale volume and inode head represented in the list of stale inode heads 295 without using the volume head of the volume, whereby the volume head has already been removed from memory 240.

Various Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a non-transitory computer readable medium. The computer readable medium may comprise a storage medium having instructions stored thereon/in which may be used to control, or cause, a computer to perform any of the processes of an embodiment. The storage medium may include, without limitation, any type of device including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The algorithm, techniques, processes, or methods described in connection with embodiments disclosed herein may be embodied directly in hardware, in software executed by a processor, or in a combination of the two. In some embodiments, any software application, program, tool, module, or layer described herein may comprise an engine comprising hardware and/or software configured to perform embodiments described herein. In general, functions of a software application, program, tool, module, or layer described herein may be embodied directly in hardware, or embodied as software executed by a processor, or embodied as a combination of the two. A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

What is claimed is:

1. A computing device comprising:
a memory containing a machine readable medium comprising machine executable code having stored thereon instructions for performing a method of deferring invalidation of inodes;
a processor coupled to the memory, the processor configured to execute the machine executable code to cause the processor to:
store inode head data comprising a plurality of inodes associated with a corresponding plurality of storage objects in a storage volume designated for removal;
mark each storage volume designated for removal to indicate that the corresponding plurality of storage objects are not accessible and that an inode invalidation walk-through is to be performed on the storage volume;
send an indication that the invalidation walk-through will be performed on the storage volume designated for removal after the marking has been completed;
perform the inode invalidation walk-through, wherein the inode invalidation walk-through comprises removing the plurality of inodes associated with the plurality of storage objects;
receive an access request for at least one of the plurality of storage objects in the volume to be removed, the access request comprising a volume identifier for a storage volume; and
provide an indication that the storage volume has been removed when the volume identifier corresponds to the storage volume designated for removal.

2. The device of claim 1, wherein the access request further comprises a file identifier and the processor is further configured to be capable of executing programmed instructions, which comprise the programmed instructions stored in the memory to:
provide a removal indication that the plurality of inodes have been removed when the file identifier corresponds to the storage volume designated for removal.

3. The device of claim 1, wherein the indication comprises an invalid data indication that the plurality of storage objects comprises invalid data.

4. The device of claim 1, wherein the processor is further configured to be capable of executing programmed instructions, which comprise the programmed instructions stored in the memory to
transfer ownership of the storage after the marking has been completed.

5. The device of claim 1, wherein the processor is further configured to be capable of executing programmed instructions, which comprise the programmed instructions stored in the memory to:
map the access request to the plurality of inodes associated with the corresponding plurality of storage objects; and
locate the plurality of storage objects based on the plurality of mapped inodes.

6. The device of claim 1, wherein the processor is further configured to be capable of executing programmed instructions, which comprise the programmed instructions stored in the memory to:
store invalidation walk-through metadata comprising a listing of the removed plurality of inodes.

7. A method comprising:
storing, by a storage server, inode head data comprising a plurality of inodes associated with a corresponding plurality of storage objects in a storage volume designated for removal;
marking, by the storage server, each storage volume designated for removal to indicate that the corresponding plurality of storage objects are not accessible and that an inode invalidation walk-through is to be performed on the storage volume;
sending, by the storage server, an indication that the invalidation walk-through will be performed on the storage volume designated for removal after the marking has been completed;
performing, by the storage server, the inode invalidation walk-through, wherein the inode invalidation walk-through comprises removing the plurality of inodes associated with the plurality of storage objects;
receiving, by the storage server, an access request for at least one of the storage objects in the volume to be removed, the access request comprising a volume identifier for a storage volume; and providing, by the storage server, an indication that the storage volume has been removed when the volume identifier corresponds to the storage volume designated for removal.

8. The method of claim 7, wherein the access request further comprises a file identifier and further comprising:

providing a removal indication that the plurality of inodes have been removed when the file identifier corresponds to the storage volume designated for removal.

9. The method of claim 7, wherein the indication comprises an invalid data indication that the plurality of storage objects comprises invalid data.

10. The method of claim 7, further comprising:

transferring, by the storage server, ownership of the storage volume after the marking has been completed.

11. The method of claim 7, further comprising:

mapping, by the storage server, the access request to the plurality of inodes associated with the corresponding plurality of storage objects; and locating, b the storage server, the plurality storage objects based on the plurality of mapped inodes.

12. The method of claim 7, further comprising:

storing, by the storage server, invalidation walk-through metadata comprising a listing of the plurality of inodes.

13. A non-transitory machine readable medium having stored thereon instructions for performing a method comprising machine executable code which when executed by at least one machine, causes the machine to:

store inode head data comprising a plurality of inodes associated with a plurality of storage objects in a storage volume designated for removal; and marking, by the storage server, each storage volume designated for removal to indicate that the corresponding plurality of storage objects are not accessible and that an inode invalidation walk-through is to be performed on the storage volume;

send an indication that the corresponding plurality of storage objects are not accessible and that an inode validation walk-through is to be performed on the storage volume;

perform the inode invalidation walk-through, wherein the inode invalidation walk-through comprises removing the plurality of inodes associated with the plurality of storage of storage objects;

receive an access request for at least one of the storage objects in the volume to be removed, the access request comprising a volume identifier for a storage volume; and provide an indication that the storage volume has been removed when the volume identifier corresponds to the storage volume designated for removal.

14. The medium of claim 13, wherein the access request further comprises a file identifier and further having stored thereon instructions for performing a method comprising machine executable code which when executed by at least one machine, causes the machine to:

provide a removal indication that the plurality of inodes have been removed when the file identifier corresponds to the storage volume.

15. The medium of claim 13, wherein the indication comprises an invalid data indication that the plurality of storage objects comprises invalid data.

16. The medium of claim 13, further having stored thereon instructions for performing a method comprising machine executable code which when executed by at least one machine, causes the machine to:

transfer ownership of the storage volume after the marking has been completed.

17. The system medium of claim 13, further having stored thereon instructions for performing a method comprising machine executable code which when executed by at least one machine, causes the machine to:

map the access request to the plurality of inodes associated with the corresponding plurality of storage objects; and locate the plurality of storage objects based on the plurality of mapped inodes.

18. The medium of claim 13, further having stored thereon instructions for performing a method comprising machine executable code which when executed by at least one machine, causes the machine to store invalidation walk-through metadata comprising a listing of the removed plurality of inodes.

* * * * *